United States Patent
Horn et al.

(10) Patent No.: US 11,621,874 B2
(45) Date of Patent: Apr. 4, 2023

(54) PHASE NOISE COMPENSATION BASED ON BASE STATION CAPABILITY

(71) Applicant: QUALCOMM Incorporated, San Diego, CA (US)

(72) Inventors: Idan Michael Horn, Hod Hasharon (IL); Assaf Touboul, Netanya (IL); Shay Landis, Hod Hasharon (IL); Yehonatan Dallal, Kfar Saba (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 17/090,506

(22) Filed: Nov. 5, 2020

(65) Prior Publication Data

US 2022/0141064 A1    May 5, 2022

(51) Int. Cl.
*H04L 27/26* (2006.01)
*H04B 17/336* (2015.01)
(Continued)

(52) U.S. Cl.
CPC ....... *H04L 27/2613* (2013.01); *H04B 17/336* (2015.01); *H04L 5/0051* (2013.01);
(Continued)

(58) Field of Classification Search
None
See application file for complete search history.

(56) References Cited

U.S. PATENT DOCUMENTS

| 9,455,847 | B1* | 9/2016 | Chung | H04L 27/0014 |
| 10,608,799 | B2 | 3/2020 | Nam et al. | |
| 2018/0091350 | A1* | 3/2018 | Akkarakaran | H04L 5/0053 |
| 2018/0323933 | A1* | 11/2018 | Nam | H04W 72/12 |

(Continued)

FOREIGN PATENT DOCUMENTS

| WO | WO-2018034030 A1 * | 2/2018 | G01R 29/26 |
| WO | WO-2019160378 A1 * | 8/2019 | H04L 1/0003 |

OTHER PUBLICATIONS

NTT Docomo, Inc: "Remaining Details on PTRS", 3GPP Draft, R1-1805046, 3GPP TSG RAN WG1 Meeting #92bis, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 7, 2018 (Apr. 7, 2018), XP051414354, pp. 1-3, Retrieved from the Internet: URL:http://www.3gpp.org/ftp/tsg%5Fran/WG1%5FRL1/TSGR1%5F92b/Docs/ [retrieved on Apr. 7, 2018] pp. 1, 2.

(Continued)

*Primary Examiner* — Rebecca E Song
(74) *Attorney, Agent, or Firm* — Holland & Hart LLP

(57) ABSTRACT

Methods, systems, and devices for wireless communications are described. A user equipment (UE) may transmit, to a base station, a capability message indicating a capability supporting network-side phase noise compensation. The UE may transmit, to the base station, phase tracking reference signals based on transmitting the capability message. In an example, the phase tracking reference signals may include a UE phase noise component which may be associated with a local oscillator of the UE. The UE may receive, from the base station, a compensated downlink transmission that is compensated based on the UE phase noise component. In generating the compensated downlink transmission, the base station may apply a multiplication factor associated with the estimated UE phase noise component to the compensated downlink transmission.

30 Claims, 17 Drawing Sheets

(51) Int. Cl.
   *H04L 5/00*    (2006.01)
   *H04L 27/36*   (2006.01)
   *H04W 8/24*    (2009.01)
   *H04W 72/04*   (2023.01)
   *H04W 80/02*   (2009.01)

(52) U.S. Cl.
   CPC ............ *H04L 27/364* (2013.01); *H04W 8/24* (2013.01); *H04W 72/042* (2013.01); *H04W 80/02* (2013.01)

(56) References Cited

U.S. PATENT DOCUMENTS

2020/0322209 A1* 10/2020 Zhang .................... H04L 27/38
2021/0367734 A1* 11/2021 Qi ......................... H04L 5/0048
2022/0052807 A1*  2/2022 Liu ........................ H04L 5/0048

OTHER PUBLICATIONS

Partial International Search Report—PCT/US2021/053135—ISA/EPO—dated Jan. 26, 2022.
International Search Report and Written Opinion—PCT/US2021/053135—ISA/EPO—dated Mar. 21, 2022.

* cited by examiner

PHASE NOISE COMPENSATION BASED ON BASE STATION CAPABILITY

FIELD OF TECHNOLOGY

The following relates to wireless communications, including phase noise compensation for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Phase noise from a local oscillator of a UE may introduce noise floors that negatively impact operational signal-to-noise ratio (SNR) at the UE.

SUMMARY

The described techniques relate to improved methods, systems, devices, and apparatuses that support phase noise compensation based on base station capability. Generally, the described techniques provide for phase noise compensation for wireless communications.

A method of wireless communication at a user equipment (UE) is described. The method may include transmitting, to a base station, a capability message indicating a capability of supporting network-side phase noise compensation, transmitting, to the base station, a first set of reference signals based on the capability message, where the first set of reference signals includes a UE phase noise component, and receiving, from the base station, a compensated downlink transmission that is compensated based on the UE phase noise component of the set of reference signals.

An apparatus for wireless communication at a UE is described. The apparatus may include a processor, memory coupled with the processor, and instructions stored in the memory. The instructions may be executable by the processor to cause the apparatus to transmit, to a base station, a capability message indicating a capability of supporting network-side phase noise compensation, transmit, to the base station, a first set of reference signals based on the capability message, where the first set of reference signals includes a UE phase noise component, and receive, from the base station, a compensated downlink transmission that is compensated based on the UE phase noise component of the set of reference signals.

Another apparatus for wireless communication at a UE is described. The apparatus may include means for transmitting, to a base station, a capability message indicating a capability of supporting network-side phase noise compensation, transmitting, to the base station, a first set of reference signals based on the capability message, where the first set of reference signals includes a UE phase noise component, and receiving, from the base station, a compensated downlink transmission that is compensated based on the UE phase noise component of the set of reference signals.

A non-transitory computer-readable medium storing code for wireless communication at a UE is described. The code may include instructions executable by a processor to transmit, to a base station, a capability message indicating a capability of supporting network-side phase noise compensation, transmit, to the base station, a first set of reference signals based on the capability message, where the first set of reference signals includes a UE phase noise component, and receive, from the base station, a compensated downlink transmission that is compensated based on the UE phase noise component of the set of reference signals.

Some examples of the method, apparatuses, and non-transitory computer-readable medium described herein may further include operations, features, means, or instructions for receiving, from the base station, a configuration message associated with transmitting the first set of reference signals, the configuration message including an indication for transmitting the first set of reference signals according to a frequency domain configuration or a time domain configuration, where transmitting the first set of reference signals may be based on receiving the configuration message.

In some examples of the method, apparatuses, and non-transitory computer-readable medium described herein, the configuration message includes an indication to transmit the first set of reference signals for network-side phase noise compensation for every scheduled downlink transmission for the UE regardless of whether uplink resources for the UE may be scheduled.

Some examples of the method, apparatuses, and non-transitory computer-readable medium described herein may further include operations, features, means, or instructions for identifying a combined duration including a first duration associated with network-side estimation of the UE phase noise component and a second duration including a round trip communication delay between the UE and the base station, estimating a UE phase noise temporal variation value indicating a level of change in the UE phase noise component for a time period, and transmitting a disabling request message to the base station based on the combined duration exceeding the estimated UE phase noise temporal variation value, the request message including a request to disable network-side phase noise compensation.

Some examples of the method, apparatuses, and non-transitory computer-readable medium described herein may further include operations, features, means, or instructions for transmitting an enabling request message including a request for network-side phase noise compensation and a request for downlink reference signal disabling for a duration corresponding to the network-side phase noise compensation.

In some examples of the method, apparatuses, and non-transitory computer-readable medium described herein, the downlink reference signal includes a phase tracking reference signal (PTRS).

Some examples of the method, apparatuses, and non-transitory computer-readable medium described herein may further include operations, features, means, or instructions for receiving, from the base station, a configuration message including an indication of disabling the network-side phase noise compensation.

In some examples of the method, apparatuses, and non-transitory computer-readable medium described herein, the configuration message includes an indication of downlink reference signal enabling for a duration corresponding to the disabling of the network-side phase noise compensation, where the downlink reference signal includes a PTRS.

In some examples of the method, apparatuses, and non-transitory computer-readable medium described herein, receiving the configuration message may include operations, features, means, or instructions for receiving a media access control (MAC) control element (MAC-CE) or a downlink control information (DCI) message.

In some examples of the method, apparatuses, and non-transitory computer-readable medium described herein, the compensated downlink transmission may be compensated based on an impairment between an in-phase (I) path and a quadrature-phase (Q) path of the base station exceeding a threshold.

In some examples of the method, apparatuses, and non-transitory computer-readable medium described herein, the impairment may be estimated based on a phase difference between the I path and the Q path satisfying a phase threshold, an amplitude difference between the I path and the Q path satisfying an amplitude threshold, a temporal difference between the I path and the Q path satisfying a temporal difference threshold, or a combination thereof.

In some examples of the method, apparatuses, and non-transitory computer-readable medium described herein, transmitting the capability message may include operations, features, means, or instructions for transmitting a radio resource control message.

Some examples of the method, apparatuses, and non-transitory computer-readable medium described herein may further include operations, features, means, or instructions for receiving a second capability message from the base station indicating a capability of the base station of supporting network-side phase noise compensation, where transmitting the first set of reference signals may be based on receiving the second capability message.

A method of wireless communication at a base station is described. The method may include receiving a capability message indicating a capability of a UE of supporting network-side phase noise compensation, receiving a first set of reference signals from the UE based on the capability message, where the first set of reference signals includes a UE phase noise component, estimating the UE phase noise component based on the received first set of reference signals, generating a compensated downlink transmission that is compensated based on the estimated UE phase noise component, where generating the compensated downlink transmission includes applying a multiplication factor associated with the estimated UE phase noise component to the compensated downlink transmission, and transmitting the compensated downlink transmission to the UE.

An apparatus for wireless communication at a base station is described. The apparatus may include a processor, memory coupled with the processor, and instructions stored in the memory. The instructions may be executable by the processor to cause the apparatus to receive a capability message indicating a capability of a UE of supporting network-side phase noise compensation, receive a first set of reference signals from the UE based on the capability message, where the first set of reference signals includes a UE phase noise component, estimate the UE phase noise component based on the received first set of reference signals, generate a compensated downlink transmission that is compensated based on the estimated UE phase noise component, where generating the compensated downlink transmission includes applying a multiplication factor associated with the estimated UE phase noise component to the compensated downlink transmission, and transmit the compensated downlink transmission to the UE.

Another apparatus for wireless communication at a base station is described. The apparatus may include means for receiving a capability message indicating a capability of a UE of supporting network-side phase noise compensation, receiving a first set of reference signals from the UE based on the capability message, where the first set of reference signals includes a UE phase noise component, estimating the UE phase noise component based on the received first set of reference signals, generating a compensated downlink transmission that is compensated based on the estimated UE phase noise component, where generating the compensated downlink transmission includes applying a multiplication factor associated with the estimated UE phase noise component to the compensated downlink transmission, and transmitting the compensated downlink transmission to the UE.

A non-transitory computer-readable medium storing code for wireless communication at a base station is described. The code may include instructions executable by a processor to receive a capability message indicating a capability of a UE of supporting network-side phase noise compensation, receive a first set of reference signals from the UE based on the capability message, where the first set of reference signals includes a UE phase noise component, estimate the UE phase noise component based on the received first set of reference signals, generate a compensated downlink transmission that is compensated based on the estimated UE phase noise component, where generating the compensated downlink transmission includes applying a multiplication factor associated with the estimated UE phase noise component to the compensated downlink transmission, and transmit the compensated downlink transmission to the UE.

Some examples of the method, apparatuses, and non-transitory computer-readable medium described herein may further include operations, features, means, or instructions for transmitting, to the UE, a configuration message associated with transmitting the first set of reference signals, the configuration message including an indication for transmitting the first set of reference signals according to a frequency domain configuration or a time domain configuration, where receiving the first set of reference signals may be based on transmitting the configuration message.

In some examples of the method, apparatuses, and non-transitory computer-readable medium described herein, the configuration message includes an indication for the UE to transmit the first set of reference signals for network-side phase noise compensation for every scheduled downlink transmission for the UE regardless of whether uplink resources for the UE may be scheduled.

Some examples of the method, apparatuses, and non-transitory computer-readable medium described herein may further include operations, features, means, or instructions for receiving a disabling request message including a request to disable network-side phase noise compensation, and disabling the network-side phase noise compensation based on the received disabling request message.

Some examples of the method, apparatuses, and non-transitory computer-readable medium described herein may further include operations, features, means, or instructions for receiving an enabling request message including a request for network-side phase noise compensation and a request for downlink reference signal disabling for a duration corresponding to the network-side phase noise compensation.

In some examples of the method, apparatuses, and non-transitory computer-readable medium described herein, the downlink reference signal includes a PTRS.

Some examples of the method, apparatuses, and non-transitory computer-readable medium described herein may further include operations, features, means, or instructions for identifying a combined duration including a first duration associated with network-side estimation of the UE phase noise component and a second duration including a round trip communication delay between the UE and the base station, estimating a UE phase noise temporal variation value indicating a level of change in the UE phase noise component for a time period, disabling the network-side phase noise compensation based on the combined duration exceeding the estimated UE phase noise temporal variation value, and transmitting a configuration message to the UE including an indication of the disabling of the network-side phase noise compensation.

In some examples of the method, apparatuses, and non-transitory computer-readable medium described herein, the configuration message includes an indication of downlink reference signal enabling for a duration corresponding to the disabling of the network-side phase noise compensation, the method further including, and transmitting a set of downlink reference signals based on the indication of downlink reference signal enabling, where the downlink reference signals include PTRSs.

In some examples of the method, apparatuses, and non-transitory computer-readable medium described herein, transmitting the configuration message may include operations, features, means, or instructions for transmitting a MAC-CE or a DCI message.

Some examples of the method, apparatuses, and non-transitory computer-readable medium described herein may further include operations, features, means, or instructions for estimating an impairment between an I path and a Q path of the base station, where generating the compensated downlink transmission includes compensating the downlink transmission based on the impairment exceeding a threshold.

Some examples of the method, apparatuses, and non-transitory computer-readable medium described herein may further include operations, features, means, or instructions for estimating the impairment may be based on a phase difference between the I path and the Q path satisfying a phase threshold, an amplitude difference between the I path and the Q path satisfying an amplitude threshold, a temporal difference between the I path and the Q path satisfying a temporal difference threshold, or a combination thereof.

In some examples of the method, apparatuses, and non-transitory computer-readable medium described herein, receiving the capability message may include operations, features, means, or instructions for receiving a radio resource control message.

Some examples of the method, apparatuses, and non-transitory computer-readable medium described herein may further include operations, features, means, or instructions for transmitting a second capability message to the UE indicating a capability of the base station of supporting network-side phase noise compensation, where receiving the first set of reference signals may be based on transmitting the second capability message.

Some examples of the method, apparatuses, and non-transitory computer-readable medium described herein may further include operations, features, means, or instructions for estimating a distance between the base station and the UE, and selecting a mode from a set of modes associated with estimating the phase noise of the UE, based on the estimated distance, the set of modes including.

DETAILED DESCRIPTION

Figure 1:
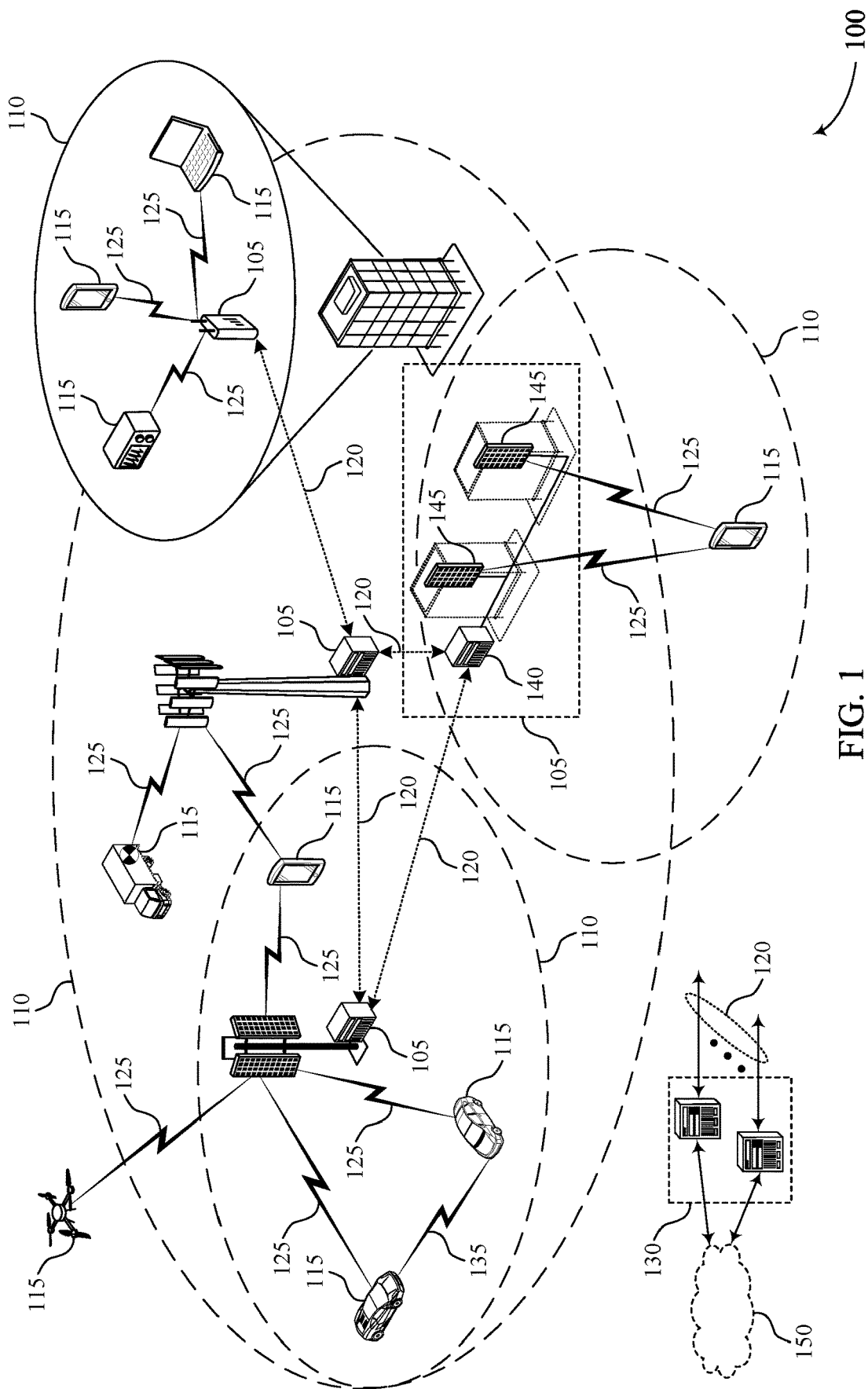
FIG. 1 illustrates an example of a system for wireless communications that supports phase noise compensation based on base station capability in accordance with aspects of the present disclosure.

A wireless communications system may support communications between user equipment (UEs) and a base station using orthogonal frequency division multiplexing (OFDM). In some cases, radio frequency (RF) impairments at a UE may degrade performance of the UE. For example, phase noise from a local oscillator of the UE may introduce noise floors that may negatively impact operational signal-to-noise ratio (SNR) at the UE. In some cases, distortion resulting due to the phase noise may negatively impact the operational SNR at a receiver side of the UE.

Some UEs may perform operations for estimating and compensating for the phase noise generated by the UE. For example, the UE may estimate and compensate for phase noise based on reference signals (e.g., phase tracking reference signals (PTRSs)) the UE receives from a base station. However, such operations may result in high power consumption at the UE (e.g., in the digital domain, at digital components of the UE). For example, in some UEs, such operations may result in higher power consumption at relatively higher bandwidths such as the sub-terahertz frequency range (e.g., FR4). Additionally, in some systems, the transmission and receiving of the reference signals may equate to about 4% of overall overhead on throughput.

Additionally, in some systems, digital receivers of some UEs may employ analog components in the demodulation process associated with downlink transmissions received from a base station. Accordingly, the analog components may suffer from imbalances between the in-phase (I) and quadrature-phase (Q) branches thereof (e.g., IQ mismatch). In some cases, compensating for such IQ impairments may additionally contribute to the increased power consumption at the UEs.

Some techniques for compensating for IQ impairments at the transmitter side may result in further degradation at the receiver side due to phase noise. Accordingly, millimeter wave (mmW) architecture solutions which are implemented at the UE using such techniques may be impractical at higher bandwidths such as the sub-terahertz frequency range. Techniques for compensating for phase noise and IQ mismatch at a transmitting device (e.g., a base station) are desired.

According to examples of aspects described herein, a UE may transmit, to a base station, a capability message indicating a capability supporting network-side phase noise compensation. In some aspects, the UE may transmit, to the base station, reference signals (e.g., uplink PTRSs) based on transmitting the capability message. The reference signals may include a UE phase noise component which may be associated with (e.g., generated due to) a local oscillator of the UE. The UE may receive, from the base station, a compensated downlink transmission that is compensated based on the UE phase noise component.

A base station may receive a capability message indicating a capability of a UE of supporting network-side phase noise compensation. In some aspects, the base station may receive reference signals (e.g., uplink PTRSs) from the UE based on receiving the capability message. In an example, the reference signals (e.g., uplink PTRSs) may include a UE phase noise component. The base station may estimate the UE phase noise component based on the received reference signals. In some aspects, the base station may generate a compensated downlink transmission that is compensated based on the estimated UE phase noise component. In an example, generating the compensated downlink transmission may include applying a multiplication factor associated with the estimated UE phase noise component to the downlink transmission. The base station may transmit the compensated downlink transmission to the UE.

In an example, the UE may receive a configuration message from the base station indicating how to transmit the reference signals (e.g., uplink PTRSs). For example, the configuration message may indicate to the UE to transmit the reference signals (e.g., PTRSs) according to a frequency domain or a time domain. Additionally, or alternatively, the configuration message may indicate to the UE to transmit a reference signal (e.g., uplink PTRS) for every scheduled downlink transmission for the UE, regardless of whether uplink resources (e.g., physical uplink shared channel (PUSCH) resources) have been scheduled for the UE. For example, the configuration message may indicate to the UE to transmit a reference signal (e.g., uplink PTRS) for every scheduled downlink transmission for the UE, even in an absence of uplink resources (e.g., PUSCH resources).

In some aspects, the UE or the base station may evaluate whether UE phase noise variation over time is less than or equal to a combined duration, where the duration may include a duration for network-side estimation of the UE phase noise component plus a duration including a round trip communication delay (also referred to herein as round trip time) between the UE and the base station. For example, the UE may identify the combined duration and estimate UE phase noise variation over time (also referred to herein as a UE phase noise temporal variation value) for a time period. In an example aspect, the UE may evaluate whether the estimated UE phase noise temporal variation value for the time period is less than or equal to the combined duration. In an example, based on the UE evaluating that the combined duration exceeds the estimated UE phase noise temporal variation value, the UE may transmit a request message (e.g., a radio resource control (RRC) message) to the base station for disabling network-side phase noise compensation. The base station may disable network-side phase noise compensation based on the request message.

Additionally, or alternatively, the base station may identify the combined duration and estimate the temporal variation value of the UE phase noise for a time period. In an example aspect, the base station may evaluate whether the estimated UE phase noise temporal variation value for the time period is less than or equal to the combined duration. In an example, based on the base station evaluating that the combined duration exceeds the estimated UE phase noise temporal variation value, the base station may disable network-side phase noise compensation. In some aspects, based on the base station evaluating that the combined duration exceeds the estimated UE phase noise temporal variation value.

The base station may transmit a configuration message (e.g., MAC-CE, DCI) indicating whether the base station has disabled or enabled network-side phase noise compensation. In an example, the base station may indicate in the configuration message that network-side phase noise compensation is enabled, and the configuration message may indicate that the base station is refraining from transmitting reference signals (e.g., downlink PTRSs) to the UE. In another example, the base station may indicate in the configuration message that network-side phase noise compensation is disabled, and the configuration message may indicate that the base station is transmitting reference signals (e.g., downlink PTRSs) to the UE. Based on the reference signals (e.g., downlink PTRSs) transmitted by the base station, for example, the UE may estimate the UE phase noise component.

In some aspects, the base station may disable or enable network-side phase noise compensation based on an IQ impairment at the base station with respect to a threshold. For example, the base station may enable network-side phase noise compensation based on the IQ impairment exceeding a threshold. In some examples, the impairment may be an IQ mismatch due to a phase noise difference, an amplitude difference, or a temporal difference (e.g., a timing skew) between an I path and a Q path of the base station. The threshold may respectively include a phase threshold, an amplitude threshold, or a temporal difference threshold.

Aspects of the subject matter described herein may be implemented to realize one or more advantages. The described techniques may support improvements in spectral efficiency and reliability, among other advantages. In some aspects, a base station providing a compensated downlink transmission to a UE may reduce power consumption and processing overhead at the UE. That is, the UE may refrain from estimating and compensating for the UE phase noise component, and accordingly, may benefit from reduced power and reduced overhead processing. In some aspects, as the base station may provide a compensated downlink transmission to the UE, transmission of reference signals (e.g., downlink PTRSs) from the base station to the UE may also be disabled, and overall throughput between the base station and the UE may be increased. The described techniques for UE phase noise compensation may provide improved reliability, connectivity, bandwidth, and throughput.

Aspects of the disclosure are initially described in the context of a wireless communications system. Examples of processes and signaling exchanges that support phase noise compensation based on base station capability are then described. Aspects of the disclosure are further illustrated by and described with reference to apparatus diagrams, system diagrams, and flowcharts that relate to phase noise compensation based on base station capability.

FIG. 1 illustrates an example of a wireless communications system 100 that supports phase noise compensation based on base station capability in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 may transmit, to a base station 105, a capability message indicating a capability of supporting network-side phase noise compensation. In some aspects, the UE 115 may transmit, to the base station 105, reference signals (e.g., uplink PTRSs) based on transmitting the capability message. In an example, the reference signals may include a UE phase noise component which may be associated with (e.g., generated due to) a local oscillator of the UE 115. That is, the uplink reference signals may be noised by the UE phase noise. The UE 115 may receive, from the base station 105, a compensated downlink transmission that is compensated based on the UE phase noise component.

A base station 105 may receive a capability message indicating a capability of a UE 115 of supporting network-side phase noise compensation. In some aspects, the base station 105 may receive reference signals (e.g., uplink PTRSs) from the UE 115 based on receiving the capability message. In an example, the reference signals (e.g., uplink PTRSs) may include a UE phase noise component. The base station 105 may estimate the UE phase noise component based on the received reference signals. In an example, the base station 105 may generate a compensated downlink transmission that is compensated based on the estimated UE phase noise component. In some examples, generating the compensated downlink transmission may include applying a multiplication factor associated with the estimated UE phase noise component to the downlink transmission. The base station 105 may transmit the compensated downlink transmission to the UE 115.

In an example, the UE 115 may receive a configuration message from the base station 105 indicating how to transmit the reference signals (e.g., uplink PTRSs). For example, the configuration message may indicate to the UE 115 to transmit the reference signals (e.g., uplink PTRSs) according to a frequency domain or a time domain. Additionally, or alternatively, the configuration message may indicate to the UE 115 to transmit a reference signal (e.g., uplink PTRS) for every scheduled downlink transmission for the UE 115, regardless of whether uplink resources (e.g., PUSCH resources) have been scheduled for the UE 115. For example, the configuration message may indicate to the UE 115 to transmit a reference signal (e.g., uplink PTRS) for every scheduled downlink transmission for the UE 115, even in an absence of uplink resources (e.g., PUSCH resources).

In some aspects, the UE 115 or the base station 105 may evaluate whether UE phase noise variation over time is less than or equal to a combined duration, where the duration may include a duration for network-side estimation of the UE phase noise component plus a duration including a round trip communication delay (also referred to herein as round trip time) between the UE 115 and the base station 105. For example, the UE 115 may identify the combined duration and estimate UE phase noise variation over time (also referred to herein as a UE phase noise temporal variation value) for a time period. In an example aspect, the UE 115 may evaluate whether the estimated UE phase noise temporal variation value for the time period is less than or equal to the combined duration. In an example, based on the UE 115 evaluating that the combined duration exceeds the estimated UE phase noise temporal variation value, the UE 115 may transmit a request message (e.g., RRC message) to the base station 105 for disabling network-side phase noise compensation. The base station 105 may disable network-side phase noise compensation based on the request message.

Additionally, or alternatively, the base station 105 may identify the combined duration and estimate the temporal variation value of the UE phase noise for a time period. In an example aspect, the base station 105 may evaluate whether the estimated UE phase noise temporal variation value for the time period is less than or equal to the combined duration. In an example, based on the base station 105 evaluating that the combined duration exceeds the estimated UE phase noise temporal variation value, the base station 105 may disable network-side phase noise compensation.

The base station 105 may transmit a configuration message (e.g., MAC-CE, DCI) indicating whether the base station 105 has disabled or enabled network-side phase noise compensation. In an example, the base station 105 may indicate in the configuration message that network-side phase noise compensation is enabled, and the configuration message may indicate that the base station 105 is refraining from transmitting reference signals (e.g., downlink PTRSs) to the UE 115. In another example, the base station 105 may indicate in the configuration message that network-side phase noise compensation is disabled, and configuration message may indicate that the base station 105 is transmitting reference signals (e.g., downlink PTRSs) to the UE 115. Based on the reference signals (e.g., downlink PTRSs), for example, the UE 115 may estimate the UE phase noise component.

In some aspects, the base station 105 may disable or enable network-side phase noise compensation based on an IQ impairment at the base station 105 with respect to a threshold. For example, the base station 105 may enable network-side phase noise compensation based on the IQ impairment exceeding a threshold. In some examples, the impairment may be an IQ mismatch due to a phase noise difference between an I path and a Q path of the base station 105 exceeding a phase threshold. In an example, the impairment may be an IQ mismatch due to an amplitude difference between an I path and a Q path of the base station 105 exceeding an amplitude threshold. In another example, the impairment may be an IQ mismatch due to a temporal difference (e.g., a timing skew) between an I path and a Q path of the base station 105 exceeding or a temporal difference threshold.

Figure 2:
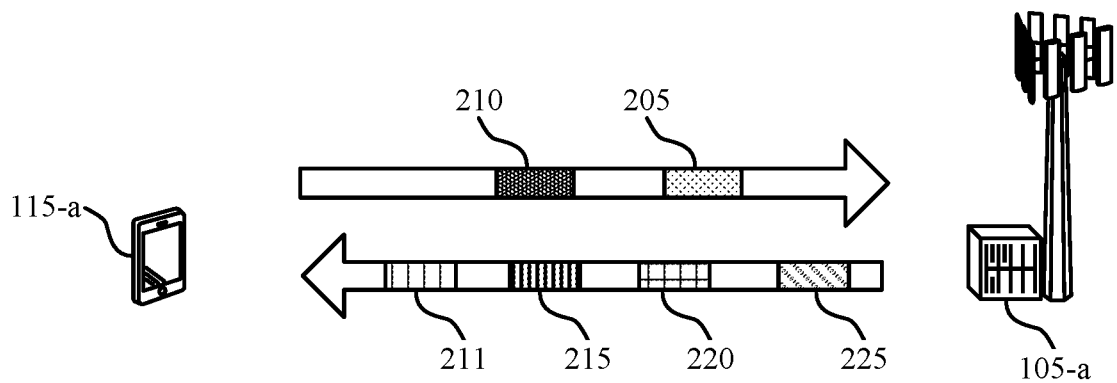
FIG. 2 illustrates an example of a wireless communications system that supports phase noise compensation based on base station capability in accordance with aspects of the present disclosure.

FIG. 2 illustrates an example of a wireless communications system 200 that supports phase noise compensation based on base station capability in accordance with aspects of the present disclosure. In some examples, wireless communications system 200 may implement aspects of wireless communication system 100 and may include a UE 115-a and a base station 105-a, which may be examples of a UE 115 and a base station 105 respectively described with reference to FIG. 1.

The UE 115-a may transmit, to the base station 105-a, capability signaling indicating a capability supporting network-side phase noise compensation. For example, the UE 115-a may transmit a capability message 205 to the base station 105-a indicating a capability of the UE 115-a for supporting network-side phase noise compensation. In some aspects, the UE 115-a may receive, from the base station 105-a, capability signaling indicating a capability of the base station 105-a of supporting network-side phase noise compensation. For example, the UE 115-a may receive a capability message 211 from the base station 105-a indicating the capability of the base station 105-a of supporting network-side phase noise compensation.

In an example, the UE 115-a may transmit uplink reference signals 210 to the base station 105-a based on transmitting the capability message 205. In some examples, the UE 115-a may transmit uplink reference signals 210 to the base station 105-a based on receiving the capability message 211. In some aspects, the uplink reference signals 210 may include a UE phase noise component which may be associated with one or more components of the UE 115-a. For example, the UE phase noise component may be generated due to one or more components at a receiver of the UE 115-a. In an example, the UE phase noise component may include phase noise generated at a local oscillator of the UE 115-a.

The uplink reference signals 210 may be uplink PTRS signals. In an example, the UE 115-a may receive a configuration message 215 from the base station 105-a indicating how to transmit the reference signals 210 (e.g., uplink PTRSs). For example, the configuration message 215 may indicate to the UE 115-a to transmit the uplink reference signals 210 according to a frequency domain. In another example, the configuration message 215 may indicate to the UE 115-a to transmit the uplink reference signals 210 according to a time domain.

In some aspects, based on uplink reference signals 210 transmitted by the UE 115-a according to the frequency domain (e.g., based on a frequency domain configuration), the base station 105-a may track, estimate, and compensate for common phase error (CPE) associated with the UE phase noise component of the UE 115-a. The CPE may be a component of the total phase noise generated at the UE. In some other aspects, based on uplink reference signals 210 transmitted by the UE 115-a according to the time domain (e.g., based on a time domain configuration), the base station 105-a may track, estimate, and compensate for the full impact of the UE phase noise component of the UE 115-a. For example, the base station 105-a may track, estimate, and compensate for CPE and inter-carrier interference (ICI) associated with the UE phase noise component (e.g., phase noise) of the UE 115-a.

Additionally, or alternatively, the configuration message 215 may indicate to the UE 115-a to transmit an uplink reference signal 210 for every scheduled downlink transmission (e.g., every compensated downlink transmission 220) for the UE 115-a, regardless of whether uplink resources (e.g., PUSCH resources) have been scheduled for the UE 115-a. For example, the configuration message 215 may indicate to the UE 115-a to transmit an uplink reference signal 210 for every scheduled downlink transmission (e.g., every compensated downlink transmission 220) for the UE 115-a, even in an absence of uplink resources (e.g., PUSCH resources).

The base station 105-a may estimate the UE phase noise component based on the uplink reference signals 210. For example, the base station 105-a may track the phase of the local oscillator of the UE 115-a (estimate the phase noise) based on the uplink reference signals 210. In some aspects, the base station 105-a may estimate the phase noise of the UE 115-a per symbol (OFDM symbol) or per slot (OFDM slot). In some aspects, in the sub-terahertz frequency range, the expected sub-carrier spacing (SCS) will be 960 kHz. Accordingly, at such an SCS, the slot duration (OFDM slot duration) may be relatively small (e.g., about 7 µs), and phase noise on the slot or on the symbol may be relatively constant. The temporal variance of the phase noise over a time period (e.g., a slot or symbol) may be measured by the UE 115-a or the base station 105-a and may be used to determine whether to perform network-side phase noise compensation (e.g., based on a comparison of the temporal variance value to how long it takes for the base station 105-a to estimate the phase noise and communicate signaling to the UE 115-a).

In some aspects, by estimating the phase noise of the UE 115-a per symbol (OFDM symbol) or per slot (OFDM slot), the base station 105-a may adjust an accuracy level for estimating the phase noise. For example, estimating the phase noise of the UE 115-a per symbol may provide higher accuracy compared to estimating the phase noise of the UE 115-a per slot. In some aspects, by adjusting the accuracy level for estimating the phase noise, the base station 105-a may account for a frequency in which the phase noise of the UE 115-a changes over time.

In some aspects, the base station 105-a may estimate the phase noise of the UE 115-a with respect to different slot durations (e.g., shorter or longer slot durations). In an example, the base station 105-a may select whether to estimate the phase noise of the UE 115-a per a relatively shorter slot duration or a relatively longer slot duration based on an accuracy level for estimating the phase noise. For example, estimating the phase noise of the UE 115-a per the relatively shorter slot duration may provide higher accuracy compared to estimating the phase noise of the UE 115-a per the relatively longer slot duration.

In some aspects, the base station 105-a may estimate the phase noise of the UE 115-a based on a distance between the base station 105-a and the UE 115-a. In an example, based on the distance, the base station 105-a may select a mode for estimating the phase noise of the UE 115-a. For example, the base station 105-a may select whether to estimate the phase noise of the UE 115-a per symbol (OFDM symbol) or per slot (OFDM slot), based on the distance between the base station 105-a and the UE 115-a with respect to a threshold distance. In an example, the base station 105-a may estimate the phase noise of the UE 115-a per symbol (OFDM symbol) based on determining that the distance between the base station 105-a and the UE 115-a is below a threshold distance. In another example, the base station 105-a may estimate the phase noise of the UE 115-a per slot (OFDM slot) based on determining that the distance between the base station 105-a and the UE 115-a exceeds the threshold distance. In some aspects, estimating the phase noise of the UE 115-a per symbol (OFDM symbol) may correspond to a first mode, and estimating the phase noise of the UE 115-a per slot (OFDM slot) may correspond to a second mode.

The base station 105-a may generate a compensated downlink transmission 220 based on the estimated UE phase noise component. For example, the compensated downlink transmission 220 may be a downlink transmission that is compensated based on the estimated UE phase noise component. As such, a UE may not need to perform additional compensation or processing on the compensated downlink transmission 220 to account for UE phase noise. In some examples, when generating a compensated downlink transmission 220, the base station 105-a may apply a multiplication factor associated with the estimated UE phase noise component to a downlink transmission to be transmitted by the base station 105-a (e.g., the compensated downlink transmission 220). The base station 105-a may transmit the compensated downlink transmission 220 to the UE 115-a. Examples of aspects of applying the multiplication factor are described herein with reference to FIG. 3.

In some aspects, the base station 105-a may generate a compensated downlink transmission 220 (e.g., estimate and compensate for a UE phase noise component, for example, phase noise) according to a TDD mode within a self-contained integrated subframe. For example, the base station 105-a may estimate and compensate for a UE phase noise component within a slot including both uplink and downlink symbols. In some examples, estimating and compensating for a UE phase noise component according to a TDD mode within a self-contained integrated subframe may provide low latency communications. In another aspect, the base station 105-a may generate a compensated downlink transmission 220 (e.g., estimate and compensate for a UE phase noise component, for example, phase noise) according to a FDD mode.

In some aspects, the base station 105-a may generate a compensated downlink transmission 220 (e.g., estimate and compensate for a UE phase noise component, for example, phase noise) using full duplexing. For example, the base station 105-a may receive uplink reference signals 210 at the beginning of a symbol. In some aspects, for full duplexing, the base station 105-a may estimate and compensate for the UE phase noise component (e.g., phase noise) in the same symbol.

In another example, the base station 105-a may receive uplink reference signals 210 at the beginning of a slot. In some aspects, for full duplexing, the base station 105-a may estimate and compensate for the UE phase noise component (e.g., phase noise) at a same slot level. In some examples, the base station 105-a may determine, based on a latency value, whether to estimate and compensate for the UE phase noise component (e.g., phase noise) in the same symbol or in the same slot level.

In some aspects, the UE 115-a or the base station 105-a may evaluate whether to enable or disable network-side phase noise compensation, for example, based on a set of criteria. For example, the UE 115-a or the base station 105-a may evaluate, based on UE phase noise variation over time (also referred to herein as a UE phase noise temporal variation value), whether to enable or disable network-side phase noise compensation. In an example, the UE 115-a or the base station 105-a may evaluate whether UE phase noise variation over time (also referred to herein as a UE phase noise temporal variation value) is less than or equal to a combined duration. The combined duration may include a duration for network-side estimation of the UE phase noise component plus a duration including a round trip communication delay (also referred to herein as round trip time) between the UE 115-a and the base station 105-a. In some aspects, comparison of the combined duration to the UE phase noise variation over time (also referred to herein as a UE phase noise temporal variation value) may indicate an efficiency level associated with the network-side phase noise compensation.

In an example, the UE 115-a may identify the combined duration and estimate the UE phase noise variation over time (also referred to herein as a UE phase noise temporal variation value) for a time period. In an example aspect, the UE 115-a may evaluate whether the estimated UE phase noise temporal variation value for the time period is less than or equal to the combined duration. For example, based on the UE 115-a evaluating that the combined duration exceeds the estimated UE phase noise temporal variation value, the UE 115-a may transmit a request message (e.g., an RRC message, an RRC connection request message) to the base station 105-a for disabling network-side phase noise compensation. The base station 105-a may disable network-side phase noise compensation based on the request message.

Additionally, or alternatively, the base station 105-a may identify the combined duration and estimate the UE phase noise variation over time (also referred to herein as a UE phase noise temporal variation value) for a time period. In an example aspect, the base station 105-a may evaluate whether the estimated UE phase noise temporal variation value for the time period is less than or equal to the combined duration. For example, based on the base station 105-a evaluating that the combined duration exceeds the estimated UE phase noise temporal variation value, the base station 105-a may disable network-side phase noise compensation.

The base station 105-a may transmit a configuration message 215 indicating whether the base station 105-a has disabled or enabled network-side phase noise compensation. In some aspects, the base station 105-a may transmit the configuration message 215 semi-statically or dynamically. For example, the configuration message 215 may be a media access control (MAC) control element (MAC-CE). In another example, the configuration message 215 may be a downlink control information (DCI) message.

In an example, the base station 105-a may indicate in the configuration message 215 that network-side phase noise compensation is enabled, and in some aspects, that the base station 105-a is refraining from transmitting downlink reference signals 225 (e.g., downlink PTRSs) to the UE 115-a. In another example, the base station 105-a may indicate in the configuration message 215 that network-side phase noise compensation is disabled, and in some aspects, that the base station 105-a is transmitting downlink reference signals 225 (e.g., downlink PTRSs) to the UE 115-a. Based on the downlink reference signals 225 (e.g., downlink PTRSs), for example, the UE 115-a may estimate the UE phase noise component.

In some aspects, the base station 105-a may disable or enable network-side phase noise compensation based on an IQ impairment at the base station 105-a with respect to a threshold. For example, the base station 105-a may enable network-side phase noise compensation based on the IQ impairment exceeding the threshold. In an example, the impairment may be an IQ mismatch due to a phase noise difference between an I path and a Q path of the base station 105-a exceeding a phase threshold. In another example, the impairment may be an IQ mismatch due to an amplitude difference between an I path and a Q path of the base station 105-a exceeding an amplitude threshold. In some examples, the impairment may be an IQ mismatch due to a temporal difference (e.g., a timing skew) between an I path and a Q path of the base station 105-a exceeding or a temporal difference threshold.

In some examples, the base station 105-a may compensate for IQ impairments at the base station 105-a side in combination with compensating for the UE phase noise component at the base station 105-a side. In another example, the base station 105-a may compensate for IQ impairments at the base station 105-a side while refraining from compensating for the UE phase noise component. In other examples, the base station 105-a may refrain from compensating for IQ impairments, while compensating for the UE phase noise component at the base station 105-a side. Examples of aspects for network-side phase noise compensation based on an IQ impairment are described herein with reference to FIG. 3 and FIG. 4.

Figure 3:
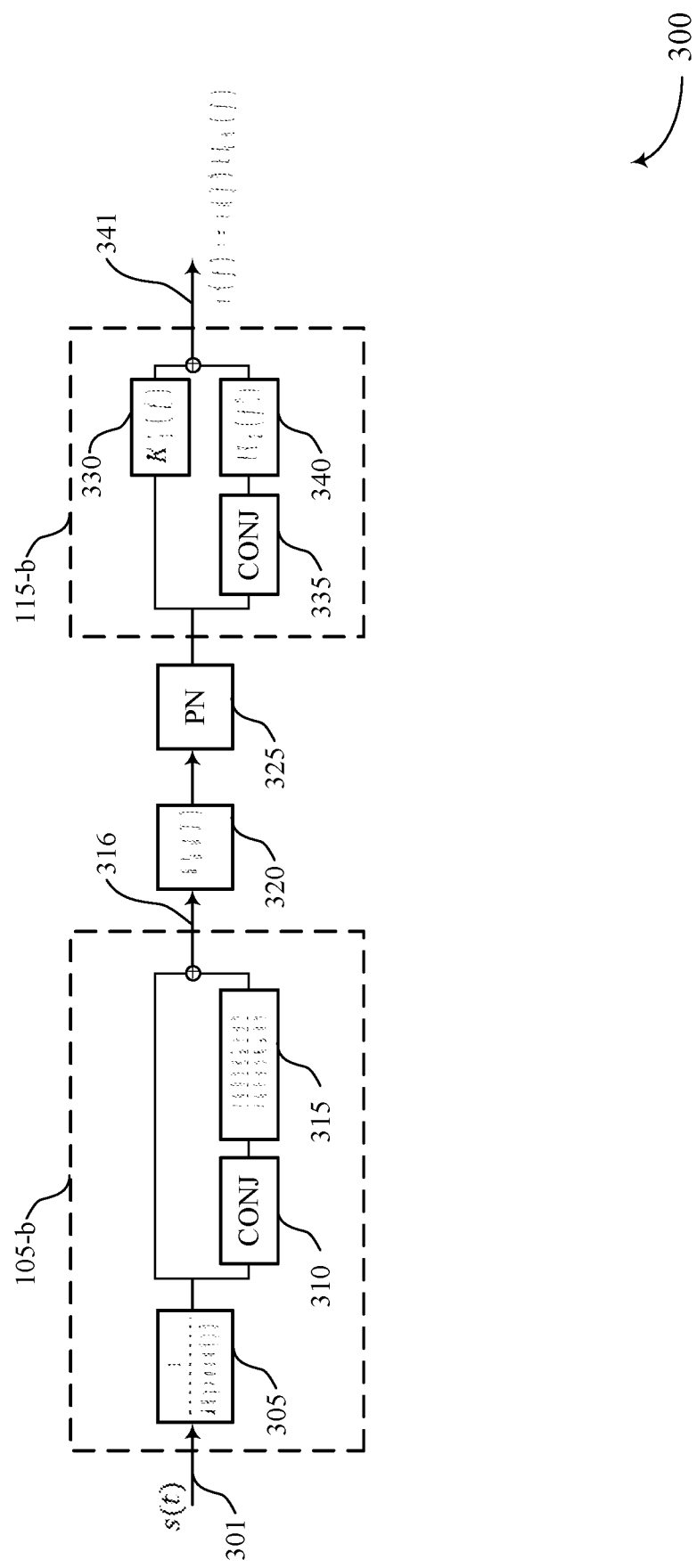
FIG. 3 illustrates an example block diagram that supports phase noise compensation based on base station capability in accordance with aspects of the present disclosure.

FIG. 3 illustrates an example of a block diagram 300 that supports IQ mismatch compensation in accordance with aspects of the present disclosure. In some examples, block diagram 300 may implement aspects of wireless communication system 100 and wireless communications system 200. In some examples, block diagram 300 may include a UE 115-b and a base station 105-b, which may be examples of a UE 115 and a base station 105 respectively described with reference to FIG. 1 or a UE 115-a and a base station 105-a respectively described with reference to FIG. 2.

In an example, the base station 105-b may receive an input signal s(t) at 301, where s(t) is a time domain OFDM signal. The base station 105-b may generate a compensated downlink transmission 316 based on the input signal s(t). For example, the base station 105-b may generate the compensated downlink transmission 316 based on a frequency response $H_{ch}(f)$ of a physical channel 320 and a UE phase noise component 325 associated with the UE 115-b. In an example, the base station 105-b may process the input signal s(t) based on the equations indicated at 305 through 315.

At $$305, \frac{1}{Hpost(f)}$$

represents the inverse of the frequency response $H_{post}(f)$, where $$H_{post}(f) = K_1(f) - \frac{K_2(f)K_2^*(-f)}{K_1^*(-f)}.$$

In the example equation for $H_{post}(f)$, $K_1(f)$ represents a frequency response associated with a common response $K_1$ associated with an IQ mismatch, $K_1^*(-f)$ represents an inverse frequency response associated with the common response $K_1$, $K_2(f)$ represents a frequency response associated with a differential $K_2$, and $K_2^*(-f)$ represents an inverse frequency response associated with the differential $K_2$. In some systems, the differential $K_2$ may be corrected or compensated for using frequency domain residual side band (FDRSB) compensation.

At 310, CONJ represents conjugation. At 315, the base station 105-b may apply the equation $$\frac{K_2(f)H_{ch}^*(-f)}{K_1^*(-f)H_{ch}(f)},$$

where $H_{ch}^*(-f)$ represents a Fourier transform of the conjugate of the frequency response $H_{ch}(f)$ of the physical channel 320. Accordingly, the base station 105-b may generate the compensated downlink transmission 316 to compensate for IQ impairments associated with $K_1$ and $K_2$.

The compensated downlink transmission 326 may be impacted by the frequency response $H_{ch}(f)$ of the physical channel 320 and the UE phase noise component 325 before being received by the UE 115-b. Additionally, IQ impairments at the UE 115-b, for example, at 330 (associated with $K_1$) and 340 (associated with $K_2$) may impact the received downlink transmission 326. In some aspects, UE 115-b may output a signal r(f) at 341, where r(f) is a frequency domain OFDM signal. In some examples, $r(f)=s(f)H_{ch}(f)$.

Figure 4:
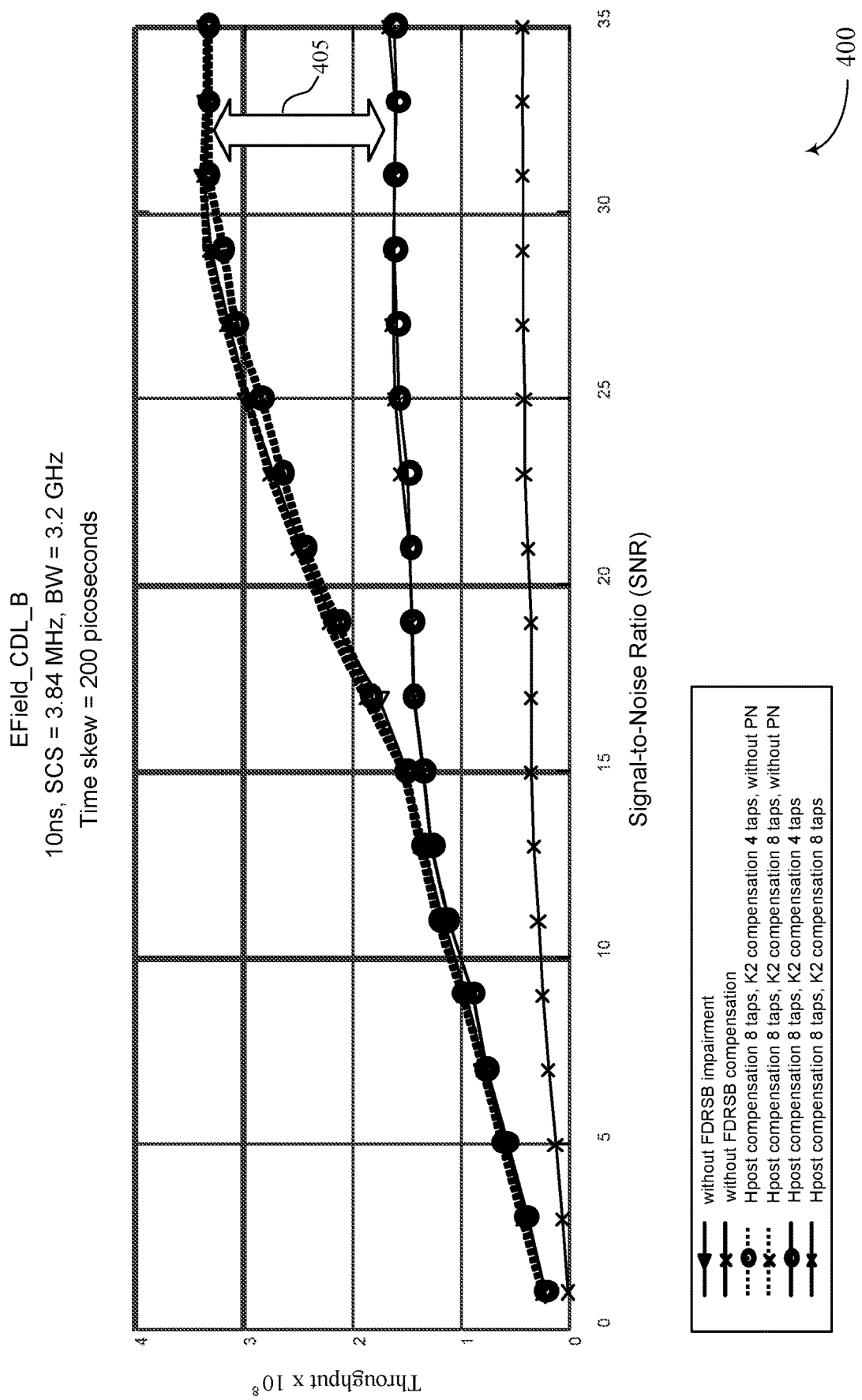
FIG. 4 illustrates an example graph that supports phase noise compensation based on base station capability in accordance with aspects of the present disclosure.

FIG. 4 illustrates an example graph 400 that supports phase noise compensation based on base station capability in accordance with aspects of the present disclosure. In some examples, the example graph 400 may implement aspects of wireless communications systems 100, wireless communications system 200, or wireless communications system 300.

The example graph 400 illustrates an example of throughput versus SNR for block diagram 300 (e.g., phase noise compensation by the base station 105-b), for example, for example conditions in which an electric field CDL B=10 nanoseconds, SCS=3.84 MHz, BW=3.2 GHz, and a time skew between an I path and a Q path is 200 picoseconds. Referring to the example graph 400, based on the example conditions and the mismatch between the I path and the Q path (e.g., the time skew equal to 200 picoseconds), a degradation 405 may result. For example, the degradation 405 may result from phase noise (e.g., a UE phase noise component) being compensated at a UE 115, in contrast to the example techniques described herein for compensating for a UE phase noise component by a base station 105.

In some systems, the degradation 405 may be reduced by reducing the IQ mismatch (e.g., time skew between the I path and the Q path) to, for example, 5 picoseconds, 50 picoseconds, or 100 picoseconds. However, such systems, in which phase noise compensation is at the UE, may be unable to eliminate the degradation 405. In contrast, according to the examples of the aspects described herein, a base station 105 (e.g., a transmitter) may both compensate for phase noise (e.g., a UE phase noise component) and compensate for IQ impairments (e.g., reduce the mismatch between the I path and the Q path), thereby eliminating the degradation 405 or mitigating the degradation 405 to a relatively larger degree compared to such systems.

Figure 5:
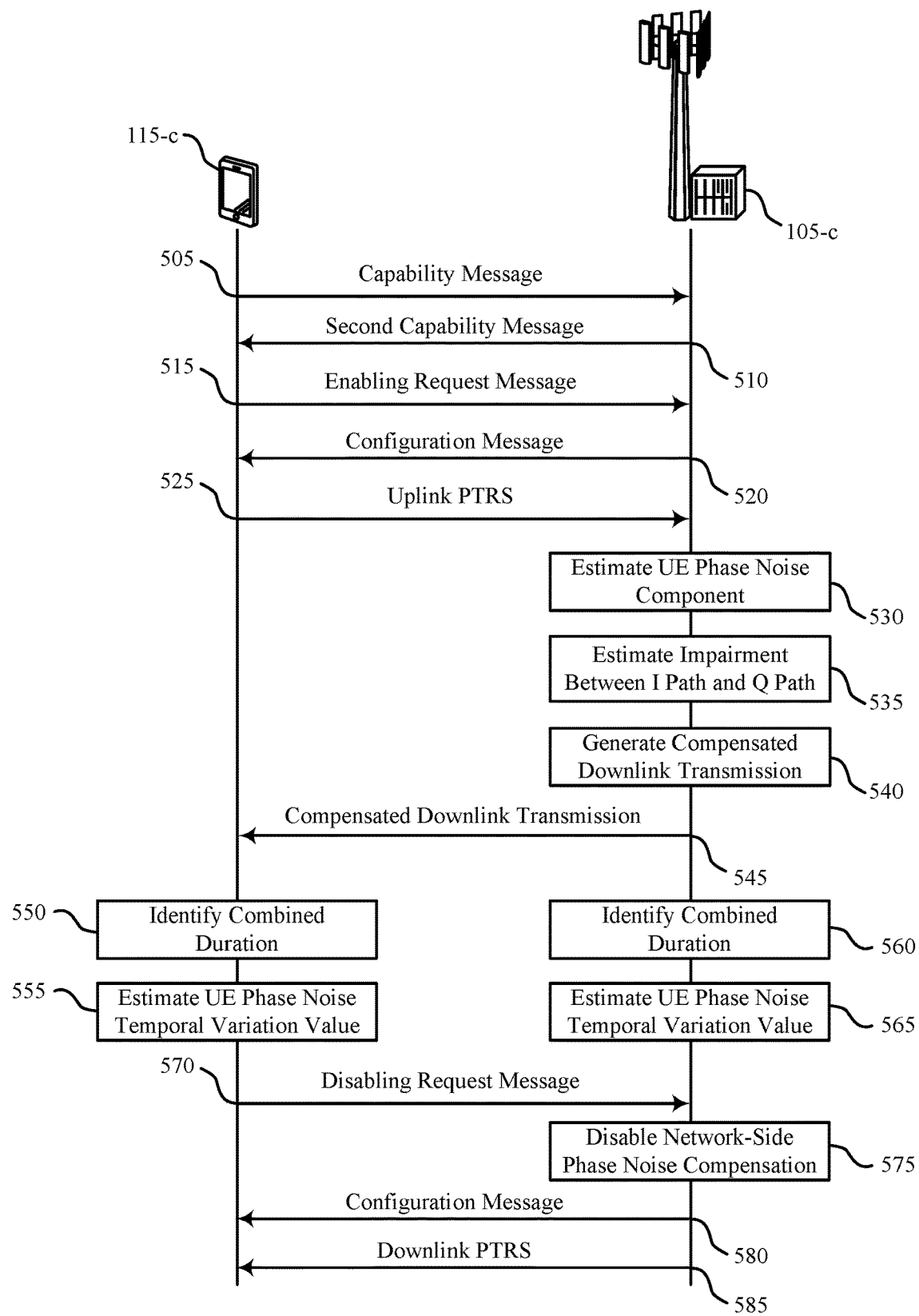
FIG. 5 illustrates an example of a process flow that supports phase noise compensation based on base station capability in accordance with aspects of the present disclosure.

FIG. 5 illustrates an example of a process flow 500 that supports phase noise compensation based on base station capability in accordance with aspects of the present disclosure. In some examples, process flow 500 may implement aspects of wireless communications systems 100, wireless communications system 200, or wireless communications system 300. In some aspects, process flow 500 may include aspects of the graph 400. Process flow 500 may be implemented by a UE 115-c or a base station 105-c. UE 115-c may be an example of a UE 115, a UE 115-a, or a UE 115-b described with reference to FIGS. 1-3. Base station 105-c may be an example of a base station 105, a base station 105-a, or a base station 105-b described with reference to FIGS. 1-3.

At 505, the UE 115-c may transmit, to the base station 105-c, a capability message indicating a capability of supporting network-side phase noise compensation. In some examples, transmitting the capability message may include transmitting a RRC message.

At 510, the UE 115-c may receive a second capability message from the base station 105-c indicating a capability of the base station 105-c of supporting network-side phase noise compensation, where transmitting the first set of reference signals is based on receiving the second capability message.

At 515, the UE 115-c may transmit an enabling request message including a request for network-side phase noise compensation and a request for downlink reference signal disabling for a duration corresponding to the network-side phase noise compensation. In some aspects, the downlink reference signal may include a PTRS (e.g., a downlink PTRS).

At 520, the UE 115-c may receive, from the base station 105-c, a configuration message associated with transmitting a first set of reference signals, the configuration message including an indication for transmitting the first set of reference signals according to a frequency domain configuration or a time domain configuration. In some aspects, the configuration message may include an indication to transmit the first set of reference signals for network-side phase noise compensation for every scheduled downlink transmission for the UE regardless of whether uplink resources for the UE are scheduled.

At 525, the UE 115-c may transmit, to the base station 105-c, the first set of reference signals based on the capability message, where the first set of reference signals may include a UE phase noise component. In some aspects, the first set of reference signals may include an uplink reference signal or an uplink PTRS.

At 530, the base station 105-c may estimate the UE phase noise component based on the received first set of reference signals.

At 535, the base station 105-c may estimate an impairment between an I path and a Q path of the base station 105-c. In some aspects, the base station 105-c may estimate the impairment based on a phase difference between the I path and the Q path satisfying a phase threshold, an amplitude difference between the I path and the Q path satisfying an amplitude threshold, a temporal difference between the I path and the Q path satisfying a temporal difference threshold, or a combination thereof.

At 540, the base station 105-c may generate a compensated downlink transmission that is compensated based on the estimated UE phase noise component. In some examples, generating the compensated downlink transmission may include compensating the downlink transmission based on the impairment exceeding a threshold. In some aspects, generating the compensated downlink transmission may include applying a multiplication factor associated with the estimated UE phase noise component to the compensated downlink transmission.

At 545, the base station 105-c may transmit the compensated downlink transmission to the UE 115-c.

At 550, the UE 115-c may identify a combined duration including a first duration associated with network-side estimation of the UE phase noise component and a second duration including a round trip communication delay between the UE and the base station 105-c. At 555, the UE 115-c may estimate a UE phase noise temporal variation value indicating a level of change in the UE phase noise component for a time period.

At 560, the base station 105-c may identify a combined duration including a first duration associated with network-side estimation of the UE phase noise component and a second duration including a round trip communication delay between the UE and the base station 105-c. At 565, the base station 105-c may estimate a UE phase noise temporal variation value indicating a level of change in the UE phase noise component for a time period.

At 570, the UE 115-c may transmit a disabling request message to the base station 105-c based on the combined duration exceeding the estimated UE phase noise temporal variation value. In some aspects, the request message may include a request to disable network-side phase noise compensation.

At 575, the base station 105-c may disable the network-side phase noise compensation. In some examples, the base station 105-c may disable the network-side phase noise compensation based on the received disabling request message. In another example, the base station 105-c may disable the network-side phase noise compensation based on the combined duration exceeding the estimated UE phase noise temporal variation value.

At 580, the base station 105-c may transmit a configuration message to the UE including an indication of the disabling of the network-side phase noise compensation. the configuration message may include an indication of downlink reference signal enabling for a duration corresponding to the disabling of the network-side phase noise compensation. transmitting the configuration message may include transmitting a MAC-CE or a DCI message.

At 585, the base station 105-c may transmit a set of downlink reference signals based on the indication of downlink reference signal enabling. In some aspects, the downlink reference signals may include PTRSs (e.g., downlink PTRSs).

In the following description of the process flow 500, the operations between UE 115-c and base station 105-c may be transmitted in a different order than the order shown, or the operations performed by base station 105-c and UE 115-c may be performed in different orders or at different times. Certain operations may also be left out of the process flow 500, or other operations may be added to the process flow 500. It is to be understood that while base station 105-c and UE 115-c are shown performing a number of the operations of process flow 500, any wireless device may perform the operations shown.

Figure 6:
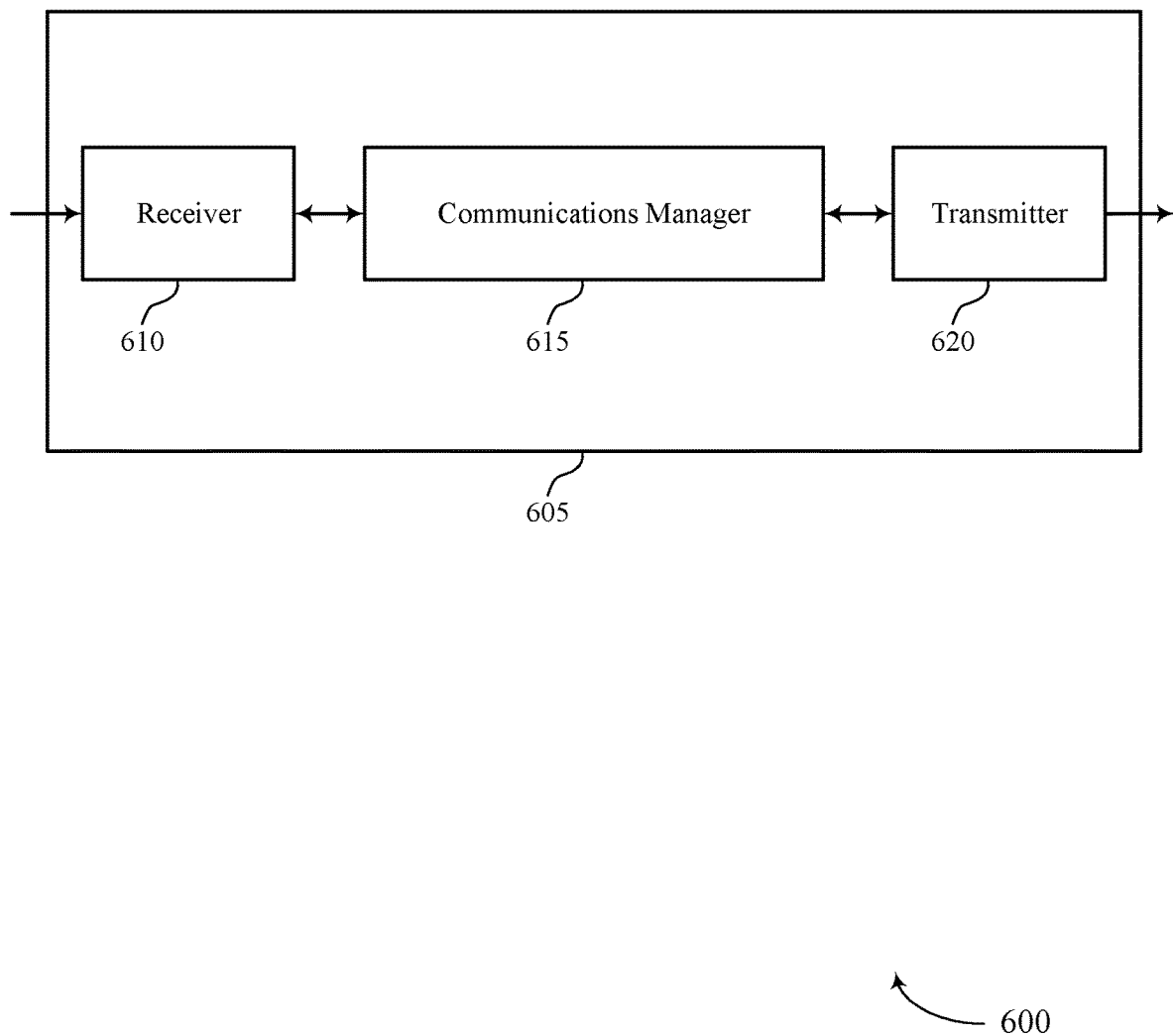
FIGS. 6 and 7 show block diagrams of devices that support phase noise compensation based on base station capability in accordance with aspects of the present disclosure.

FIG. 6 shows a block diagram 600 of a device 605 that supports phase noise compensation based on base station capability in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to phase noise compensation based on base station capability, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit, to a base station, a capability message indicating a capability of supporting network-side phase noise compensation, transmit, to the base station, a first set of reference signals based on the capability message, where the first set of reference signals includes a UE phase noise component, and receive, from the base station, a compensated downlink transmission that is compensated based on the UE phase noise component of the first set of reference signals. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
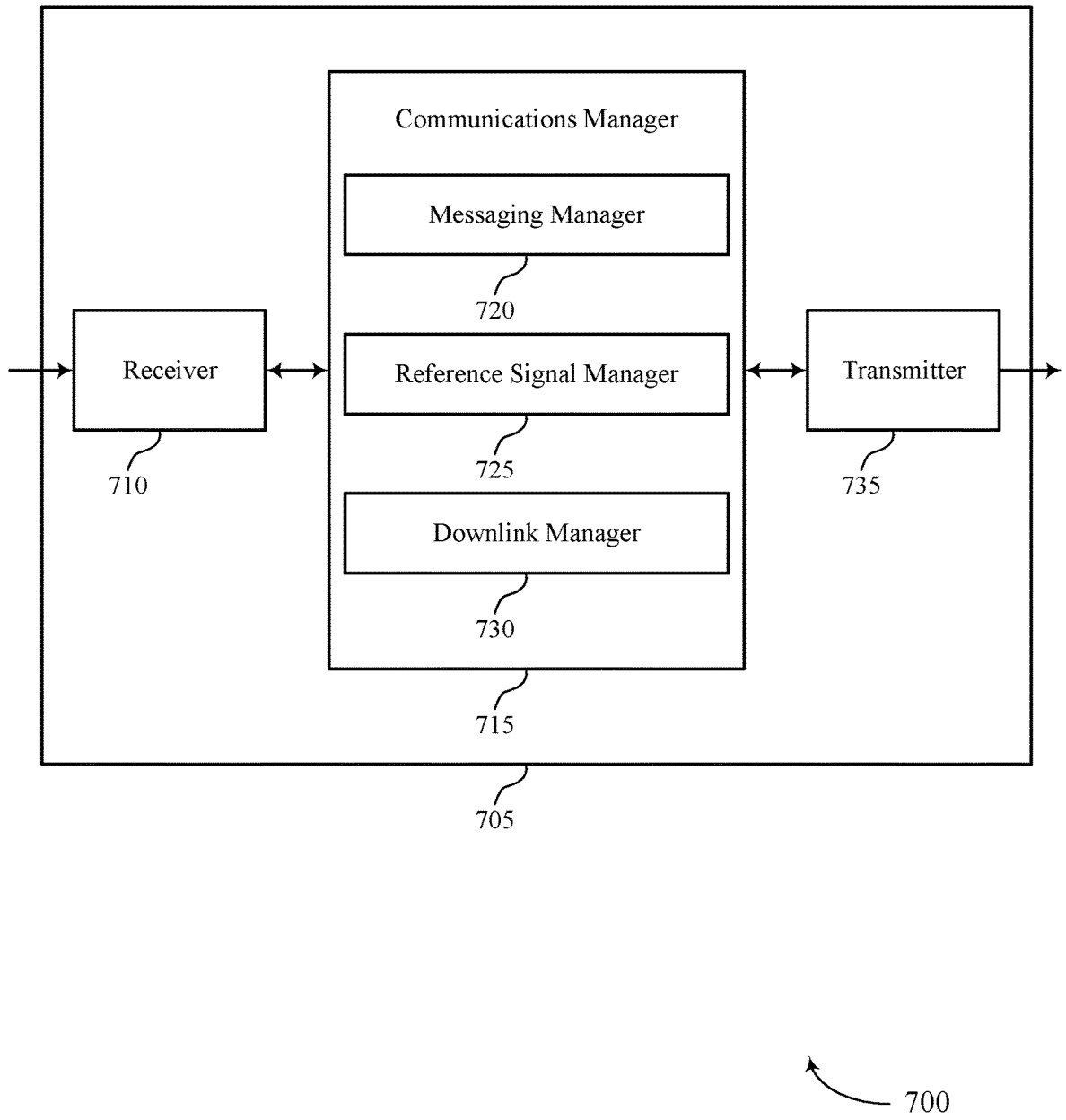

FIG. 7 shows a block diagram 700 of a device 705 that supports phase noise compensation based on base station capability in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to phase noise compensation based on base station capability, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a messaging manager 720, a reference signal manager 725, and a downlink manager 730. The communications manager 715 may be an example of aspects of the communications manager 910 described herein.

The messaging manager 720 may transmit, to a base station, a capability message indicating a capability of supporting network-side phase noise compensation.

The reference signal manager 725 may transmit, to the base station, a first set of reference signals based on the capability message, where the first set of reference signals includes a UE phase noise component.

The downlink manager 730 may receive, from the base station, a compensated downlink transmission that is compensated based on the UE phase noise component of the first set of reference signals.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
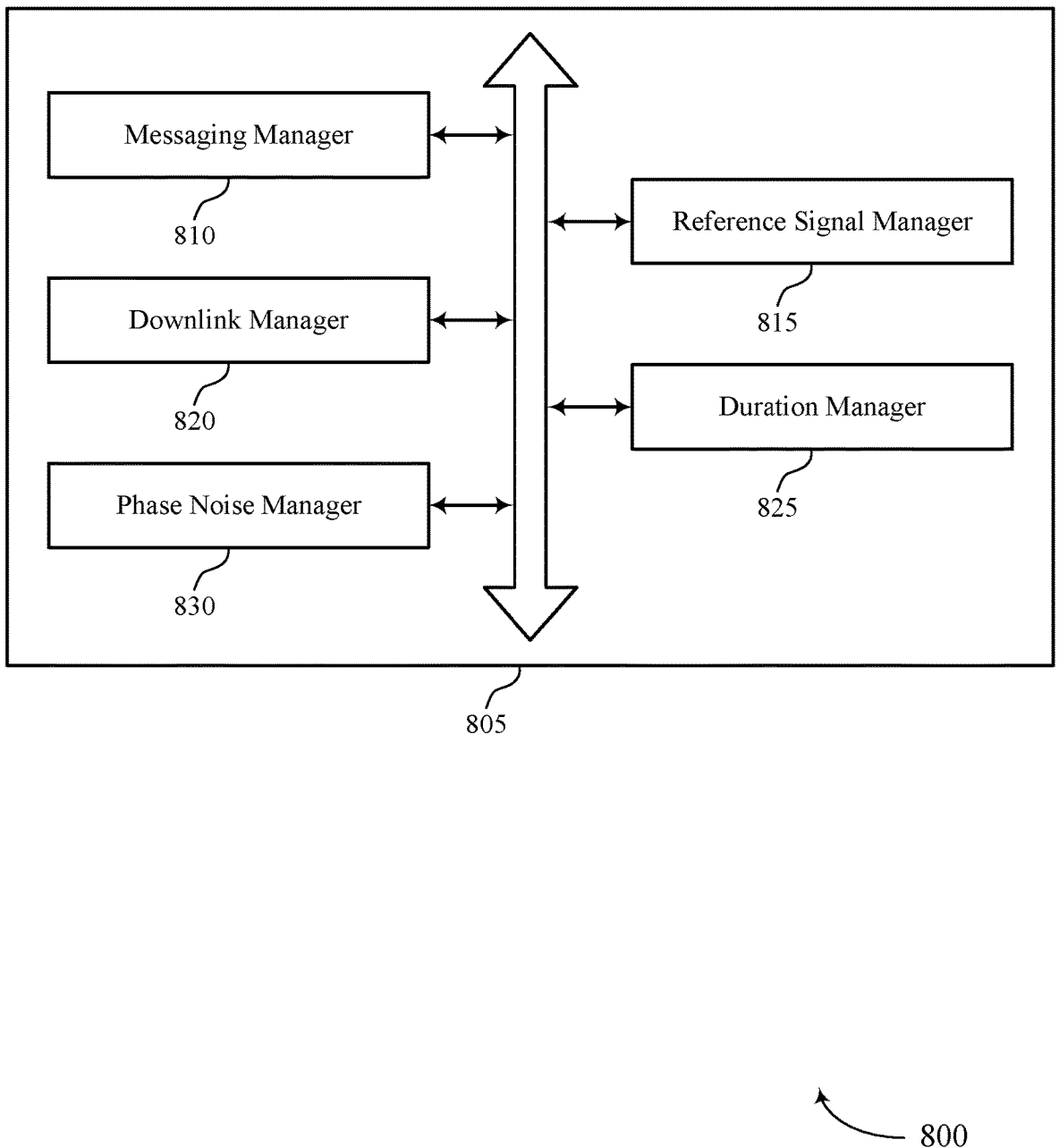
FIG. 8 shows a block diagram of a communications manager that supports phase noise compensation based on base station capability in accordance with aspects of the present disclosure.

FIG. 8 shows a block diagram 800 of a communications manager 805 that supports phase noise compensation based on base station capability in accordance with aspects of the present disclosure. The communications manager 805 may be an example of aspects of a communications manager 615, a communications manager 715, or a communications manager 910 described herein. The communications manager 805 may include a messaging manager 810, a reference signal manager 815, a downlink manager 820, a duration manager 825, and a phase noise manager 830. Each of these modules may communicate, directly or indirectly, with one another (e.g., via one or more buses).

The messaging manager 810 may transmit, to a base station, a capability message indicating a capability of supporting network-side phase noise compensation.

In some examples, the messaging manager 810 may receive, from the base station, a configuration message associated with transmitting the first set of reference signals, the configuration message including an indication for transmitting the first set of reference signals according to a frequency domain configuration or a time domain configuration.

In some examples, the messaging manager 810 may transmit a disabling request message to the base station based on the combined duration exceeding the estimated UE phase noise temporal variation value, the disabling request message including a request to disable network-side phase noise compensation.

In some examples, the messaging manager 810 may transmit an enabling request message including a request for network-side phase noise compensation and a request for downlink reference signal disabling for a duration corresponding to the network-side phase noise compensation.

In some examples, the messaging manager 810 may receive, from the base station, a configuration message including an indication of disabling the network-side phase noise compensation.

In some examples, receiving the configuration message includes receiving a MAC-CE or a DCI message.

In some examples, transmitting the capability message includes transmitting a radio resource control message.

In some examples, the messaging manager 810 may receive a second capability message from the base station indicating a capability of the base station of supporting network-side phase noise compensation, where transmitting the first set of reference signals is based on receiving the second capability message.

In some cases, the configuration message includes an indication to transmit the first set of reference signals for network-side phase noise compensation for every scheduled downlink transmission for the UE regardless of whether uplink resources for the UE are scheduled.

In some cases, the configuration message includes an indication of downlink reference signal enabling for a duration corresponding to the disabling of the network-side phase noise compensation, where the downlink reference signal includes a PTRS.

The reference signal manager 815 may transmit, to the base station, a first set of reference signals based on the capability message, where the first set of reference signals includes a UE phase noise component. In some examples, the reference signal manager 815 may transmit the first set of reference signals based on receiving the configuration message.

In some cases, the downlink reference signal includes a PTRS.

The downlink manager 820 may receive, from the base station, a compensated downlink transmission that is compensated based on the UE phase noise component of the first set of reference signals.

The duration manager 825 may identify a combined duration including a first duration associated with network-side estimation of the UE phase noise component and a second duration including a round trip communication delay between the UE and the base station.

The phase noise manager 830 may estimate a UE phase noise temporal variation value indicating a level of change in the UE phase noise component for a time period.

In some cases, the compensated downlink transmission is compensated based on an impairment between an I path and a Q path of the base station exceeding a threshold.

In some cases, the impairment is estimated based on a phase difference between the I path and the Q path satisfying a phase threshold, an amplitude difference between the I path and the Q path satisfying an amplitude threshold, a temporal difference between the I path and the Q path satisfying a temporal difference threshold, or a combination thereof.

Figure 9:
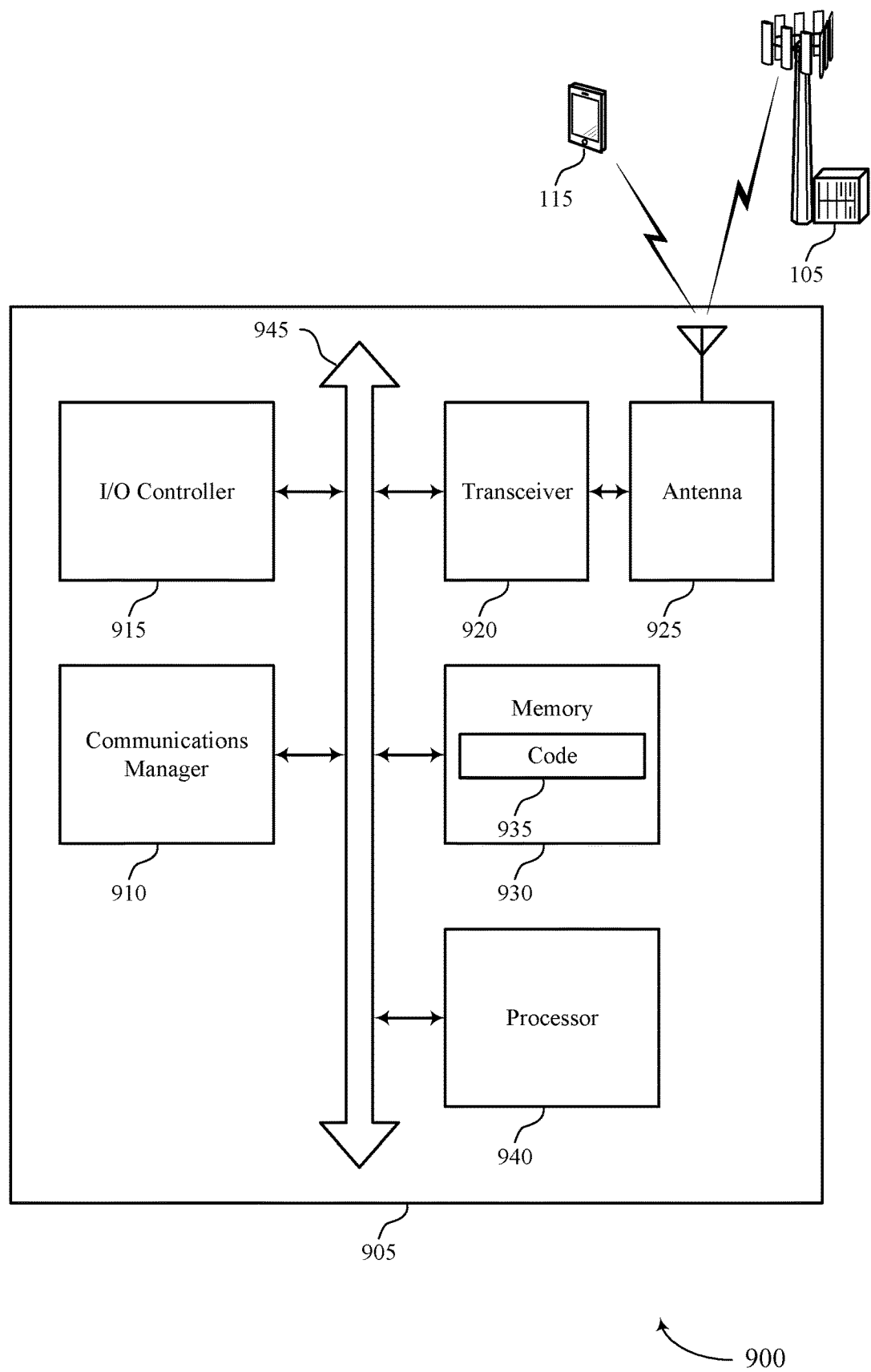
FIG. 9 shows a diagram of a system including a device that supports phase noise compensation based on base station capability in accordance with aspects of the present disclosure.

FIG. 9 shows a diagram of a system 900 including a device 905 that supports phase noise compensation based on base station capability in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit, to a base station, a capability message indicating a capability of supporting network-side phase noise compensation, transmit, to the base station, a first set of reference signals based on the capability message, where the first set of reference signals includes a UE phase noise component, and receive, from the base station, a compensated downlink transmission that is compensated based on the UE phase noise component of the first set of reference signals.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting phase noise compensation based on base station capability).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
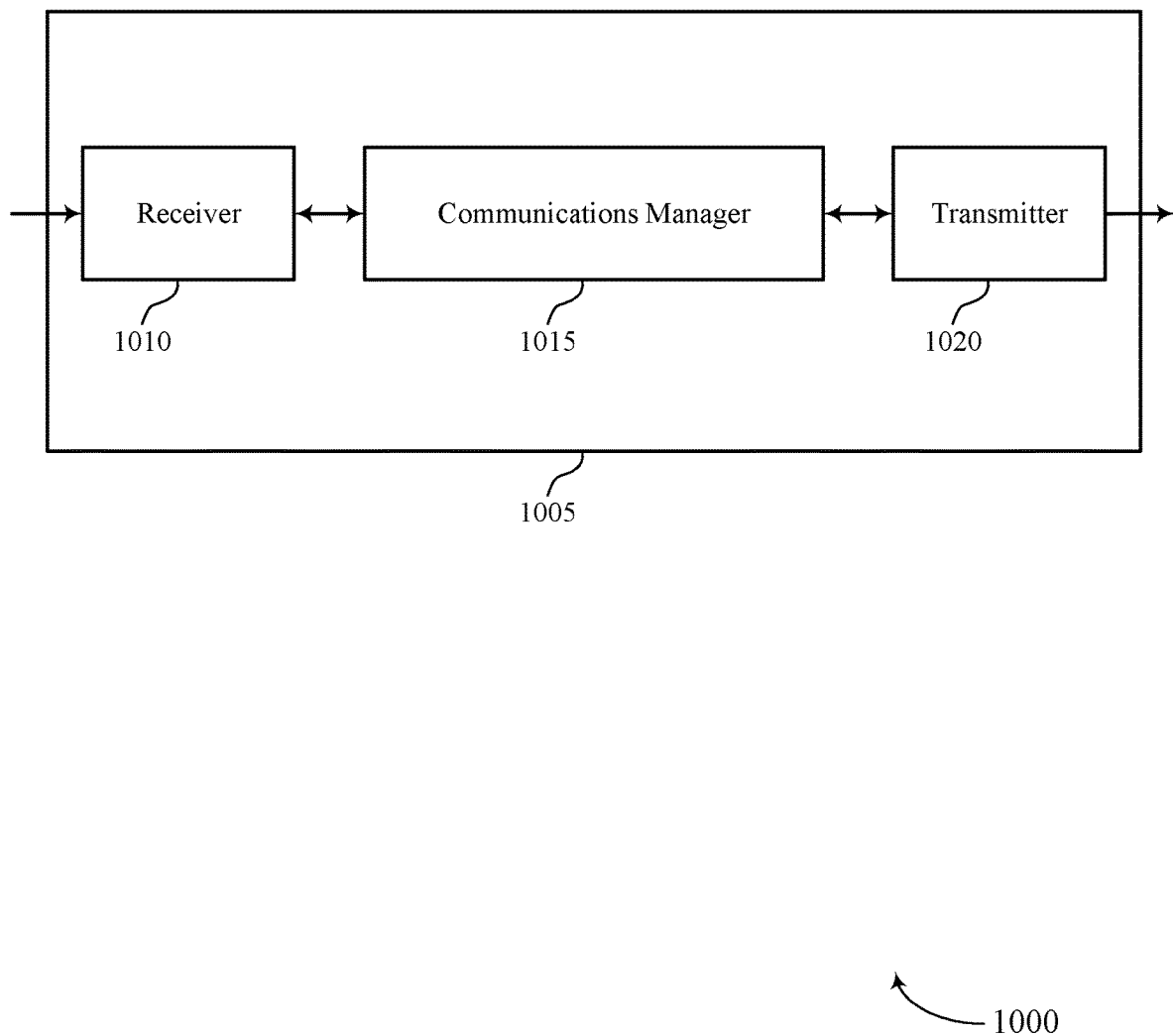
FIGS. 10 and 11 show block diagrams of devices that support phase noise compensation based on base station capability in accordance with aspects of the present disclosure.

FIG. 10 shows a block diagram 1000 of a device 1005 that supports phase noise compensation based on base station capability in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to phase noise compensation based on base station capability, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive a capability message indicating a capability of a UE of supporting network-side phase noise compensation, receive a first set of reference signals from the UE based on the capability message, where the first set of reference signals includes a UE phase noise component, estimate the UE phase noise component based on the received first set of reference signals, generate a compensated downlink transmission that is compensated based on the estimated UE phase noise component, where generating the compensated downlink transmission includes applying a multiplication factor associated with the estimated UE phase noise component to the compensated downlink transmission, and transmit the compensated downlink transmission to the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
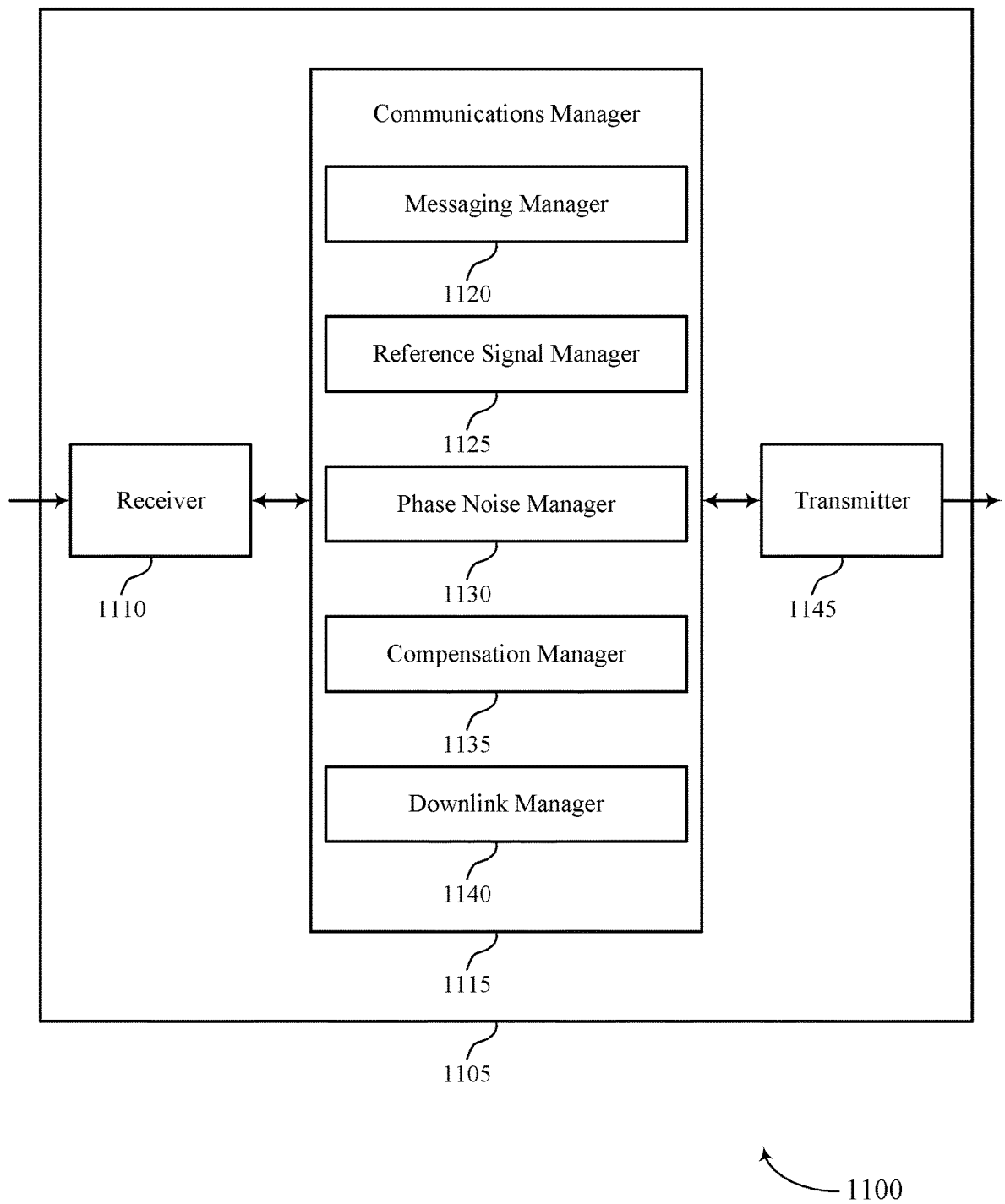

FIG. 11 shows a block diagram 1100 of a device 1105 that supports phase noise compensation based on base station capability in accordance with aspects of the present disclosure. The device 1105 may be an example of aspects of a device 1005, or a base station 105 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to phase noise compensation based on base station capability, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a messaging manager 1120, a reference signal manager 1125, a phase noise manager 1130, a compensation manager 1135, and a downlink manager 1140. The communications manager 1115 may be an example of aspects of the communications manager 1310 described herein.

The messaging manager 1120 may receive a capability message indicating a capability of a UE of supporting network-side phase noise compensation.

The reference signal manager 1125 may receive a first set of reference signals from the UE based on the capability message, where the first set of reference signals includes a UE phase noise component.

The phase noise manager 1130 may estimate the UE phase noise component based on the received first set of reference signals.

The compensation manager 1135 may generate a compensated downlink transmission that is compensated based on the estimated UE phase noise component, where generating the compensated downlink transmission includes applying a multiplication factor associated with the estimated UE phase noise component to the compensated downlink transmission.

The downlink manager 1140 may transmit the compensated downlink transmission to the UE.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
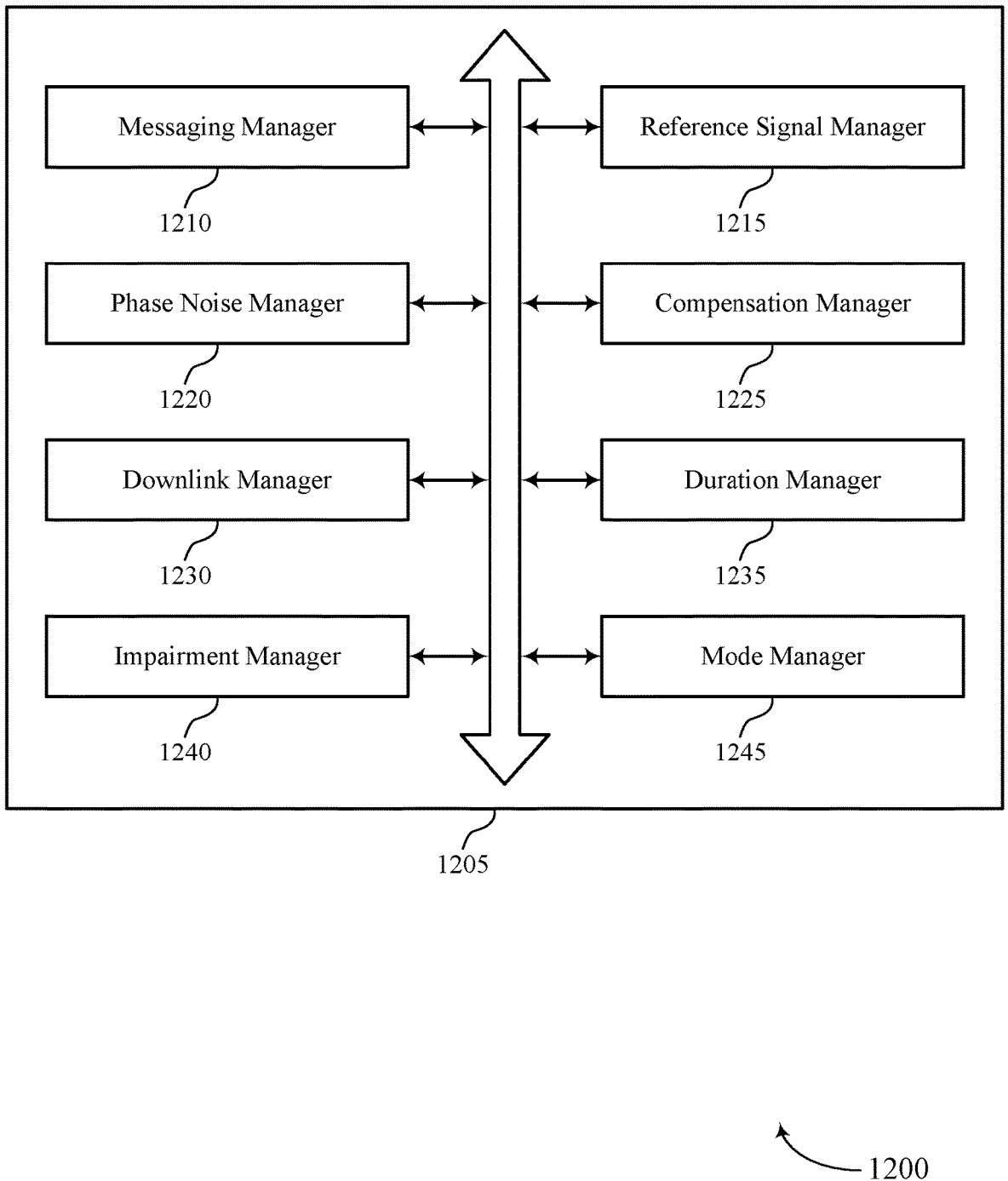
FIG. 12 shows a block diagram of a communications manager that supports phase noise compensation based on base station capability in accordance with aspects of the present disclosure.

FIG. 12 shows a block diagram 1200 of a communications manager 1205 that supports phase noise compensation based on base station capability in accordance with aspects of the present disclosure. The communications manager 1205 may be an example of aspects of a communications manager 1015, a communications manager 1115, or a communications manager 1310 described herein. The communications manager 1205 may include a messaging manager 1210, a reference signal manager 1215, a phase noise manager 1220, a compensation manager 1225, a downlink manager 1230, a duration manager 1235, an impairment manager 1240, and a mode manager 1245. Each of these modules may communicate, directly or indirectly, with one another (e.g., via one or more buses).

The messaging manager 1210 may receive a capability message indicating a capability of a UE of supporting network-side phase noise compensation.

In some examples, the messaging manager 1210 may transmit, to the UE, a configuration message associated with transmitting the first set of reference signals, the configuration message including an indication for transmitting the first set of reference signals according to a frequency domain configuration or a time domain configuration.

In some examples, the messaging manager 1210 may receive a disabling request message including a request to disable network-side phase noise compensation.

In some examples, the messaging manager 1210 may receive an enabling request message including a request for network-side phase noise compensation and a request for downlink reference signal disabling for a duration corresponding to the network-side phase noise compensation.

In some examples, the messaging manager 1210 may transmit a configuration message to the UE including an indication of the disabling of the network-side phase noise compensation.

In some examples, transmitting the configuration message includes transmitting a MAC-CE or a DCI message.

In some examples, receiving the capability message includes receiving a radio resource control message.

In some examples, the messaging manager 1210 may transmit a second capability message to the UE indicating a capability of the base station of supporting network-side phase noise compensation, where receiving the first set of reference signals is based on transmitting the second capability message.

In some cases, the configuration message includes an indication for the UE to transmit the first set of reference signals for network-side phase noise compensation for every scheduled downlink transmission for the UE regardless of whether uplink resources for the UE are scheduled.

In some cases, the configuration message includes an indication of downlink reference signal enabling for a duration corresponding to the disabling of the network-side phase noise compensation, the method further including.

The reference signal manager 1215 may receive a first set of reference signals from the UE based on the capability message, where the first set of reference signals includes a UE phase noise component.

In some examples, the reference signal manager 1215 may receive the first set of reference signals based on transmitting the configuration message.

In some examples, the reference signal manager 1215 may transmit a set of downlink reference signals based on the indication of downlink reference signal enabling, where the downlink reference signals include phase tracking reference signals (PTRSs).

In some cases, the downlink reference signal includes a phase tracking reference signal (PTRS).

The phase noise manager 1220 may estimate the UE phase noise component based on the received first set of reference signals.

In some examples, the phase noise manager 1220 may estimate a UE phase noise temporal variation value indicating a level of change in the UE phase noise component for a time period.

The compensation manager 1225 may generate a compensated downlink transmission that is compensated based on the estimated UE phase noise component, where generating the compensated downlink transmission includes applying a multiplication factor associated with the estimated UE phase noise component to the compensated downlink transmission.

In some examples, the compensation manager 1225 may disable the network-side phase noise compensation based on the received disabling request message.

In some examples, the compensation manager 1225 may disable the network-side phase noise compensation based on the combined duration exceeding the estimated UE phase noise temporal variation value.

The downlink manager 1230 may transmit the compensated downlink transmission to the UE.

The duration manager 1235 may identify a combined duration including a first duration associated with network-side estimation of the UE phase noise component and a second duration including a round trip communication delay between the UE and the base station.

The impairment manager 1240 may estimate an impairment between an I path and a Q path of the base station, where generating the compensated downlink transmission includes compensating the downlink transmission based on the impairment exceeding a threshold.

In some examples, the impairment manager 1240 may estimate the impairment is based on a phase difference between the I path and the Q path satisfying a phase threshold, an amplitude difference between the I path and the Q path satisfying an amplitude threshold, a temporal difference between the I path and the Q path satisfying a temporal difference threshold, or a combination thereof.

The mode manager 1245 may estimate a distance between the base station and the UE.

In some examples, the mode manager 1245 may select a mode from a set of modes associated with estimating the phase noise of the UE, based on the estimated distance, the set of modes including.

Figure 13:
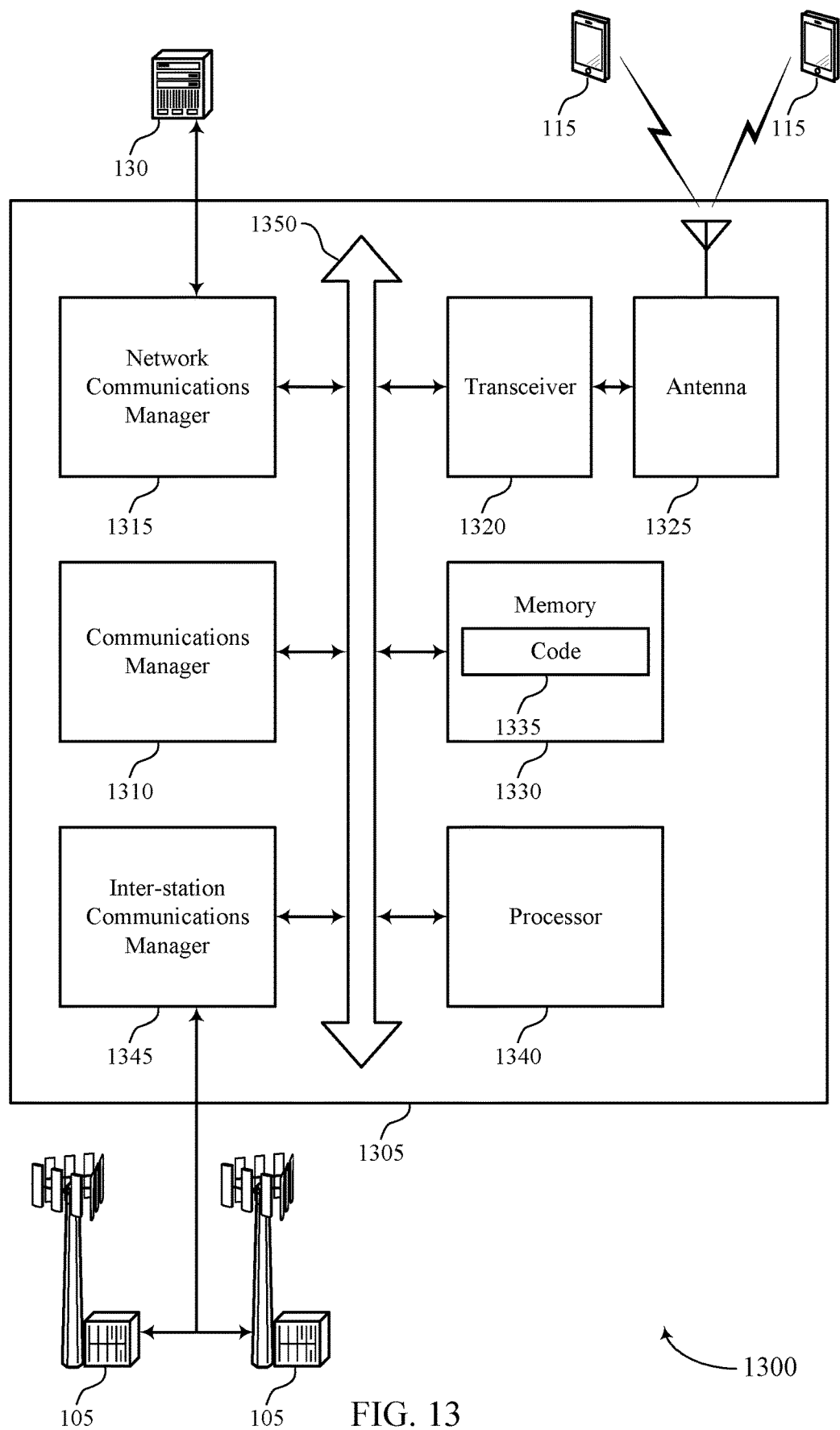
FIG. 13 shows a diagram of a system including a device that supports phase noise compensation based on base station capability in accordance with aspects of the present disclosure.

FIG. 13 shows a diagram of a system 1300 including a device 1305 that supports phase noise compensation based on base station capability in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive a capability message indicating a capability of a UE of supporting network-side phase noise compensation, receive a first set of reference signals from the UE based on the capability message, where the first set of reference signals includes a UE phase noise component, estimate the UE phase noise component based on the received first set of reference signals, generate a compensated downlink transmission that is compensated based on the estimated UE phase noise component, where generating the compensated downlink transmission includes applying a multiplication factor associated with the estimated UE phase noise component to the compensated downlink transmission, and transmit the compensated downlink transmission to the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting phase noise compensation based on base station capability).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
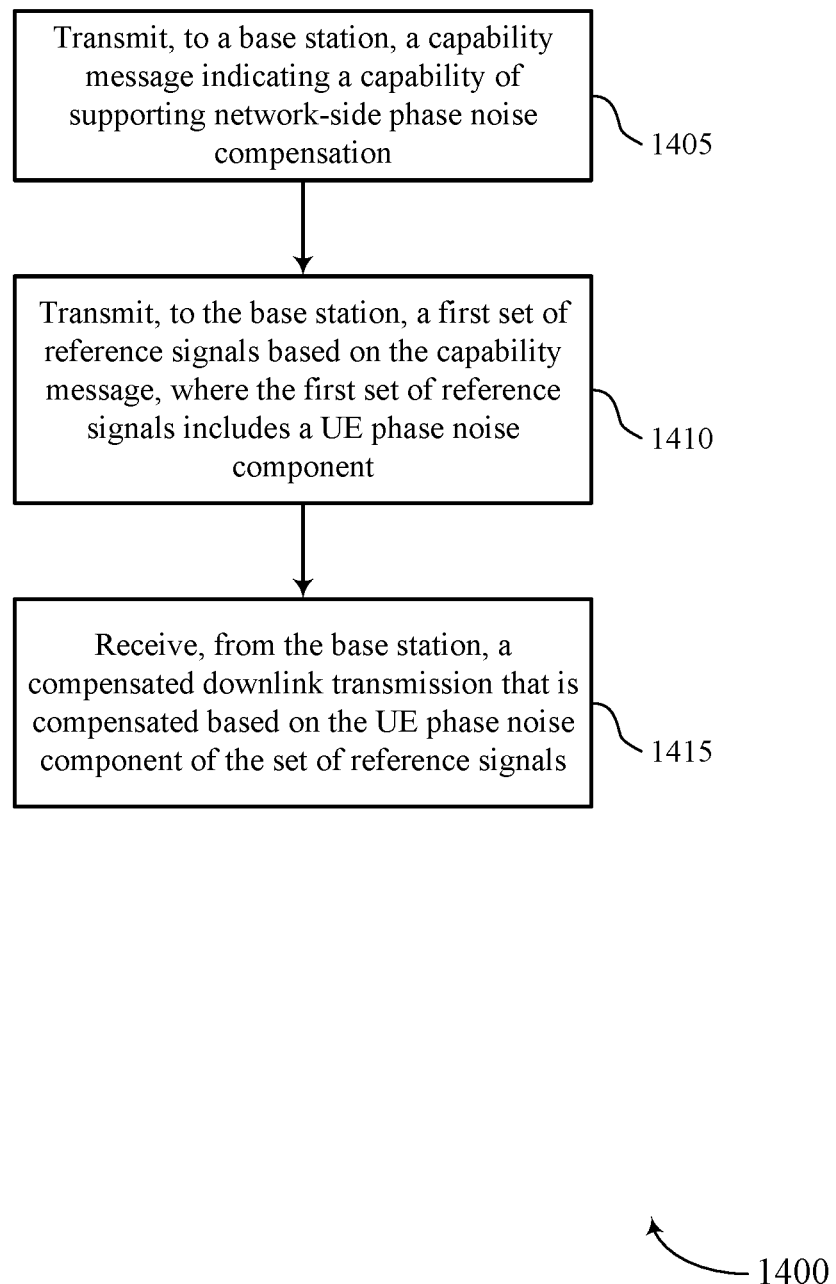
FIGS. 14 through 17 show flowcharts illustrating methods that support phase noise compensation based on base station capability in accordance with aspects of the present disclosure.

FIG. 14 shows a flowchart illustrating a method 1400 that supports phase noise compensation based on base station capability in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may transmit, to a base station, a capability message indicating a capability of supporting network-side phase noise compensation. The operations of 1405 may be performed according to the methods described herein. In some examples, aspects of the operations of 1405 may be performed by a messaging manager as described with reference to FIGS. 6 through 9.

At 1410, the UE may transmit, to the base station, a first set of reference signals based on the capability message, where the first set of reference signals includes a UE phase noise component. The operations of 1410 may be performed according to the methods described herein. In some examples, aspects of the operations of 1410 may be performed by a reference signal manager as described with reference to FIGS. 6 through 9.

At 1415, the UE may receive, from the base station, a compensated downlink transmission that is compensated based on the UE phase noise component of the first set of reference signals. The operations of 1415 may be performed according to the methods described herein. In some examples, aspects of the operations of 1415 may be performed by a downlink manager as described with reference to FIGS. 6 through 9.

Figure 15:
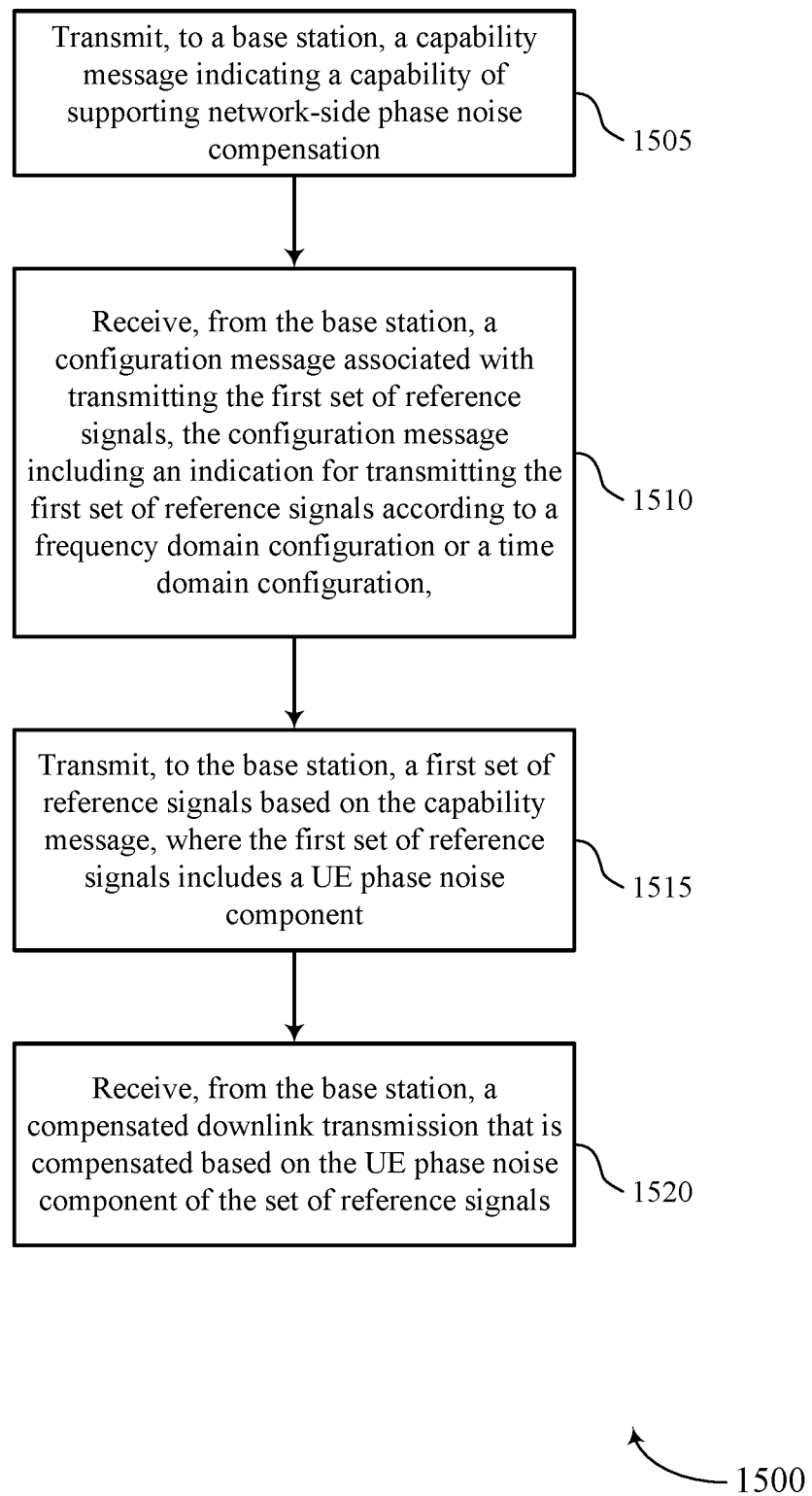

FIG. 15 shows a flowchart illustrating a method 1500 that supports phase noise compensation based on base station capability in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may transmit, to a base station, a capability message indicating a capability of supporting network-side phase noise compensation. The operations of 1505 may be performed according to the methods described herein. In some examples, aspects of the operations of 1505 may be performed by a messaging manager as described with reference to FIGS. 6 through 9.

At 1510, the UE may receive, from the base station, a configuration message associated with transmitting the first set of reference signals, the configuration message including an indication for transmitting the first set of reference signals according to a frequency domain configuration or a time domain configuration. The operations of 1510 may be performed according to the methods described herein. In some examples, aspects of the operations of 1510 may be performed by a messaging manager as described with reference to FIGS. 6 through 9.

At 1515, the UE may transmit, to the base station, a first set of reference signals based on the capability message, where the first set of reference signals includes a UE phase noise component. In some aspects, the UE may transmit the first set of reference signals based on receiving the configuration message. The operations of 1515 may be performed according to the methods described herein. In some examples, aspects of the operations of 1515 may be performed by a reference signal manager as described with reference to FIGS. 6 through 9.

At 1520, the UE may receive, from the base station, a compensated downlink transmission that is compensated based on the UE phase noise component of the first set of reference signals. The operations of 1520 may be performed according to the methods described herein. In some examples, aspects of the operations of 1520 may be performed by a downlink manager as described with reference to FIGS. 6 through 9.

Figure 16:
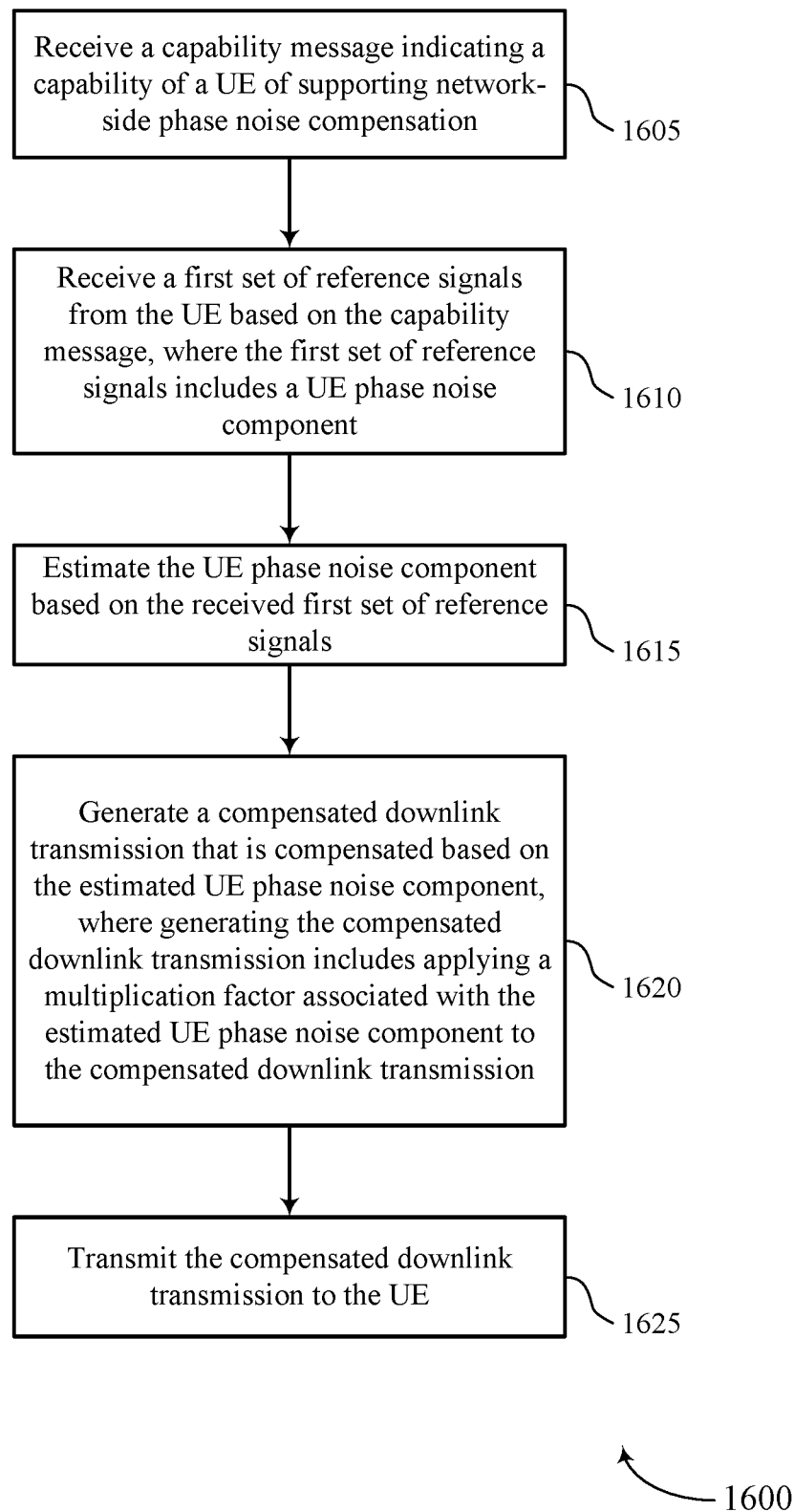

FIG. 16 shows a flowchart illustrating a method 1600 that supports phase noise compensation based on base station capability in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may receive a capability message indicating a capability of a UE of supporting network-side phase noise compensation. The operations of 1605 may be performed according to the methods described herein. In some examples, aspects of the operations of 1605 may be performed by a messaging manager as described with reference to FIGS. 10 through 13.

At 1610, the base station may receive a first set of reference signals from the UE based on the capability message, where the first set of reference signals includes a UE phase noise component. The operations of 1610 may be performed according to the methods described herein. In some examples, aspects of the operations of 1610 may be performed by a reference signal manager as described with reference to FIGS. 10 through 13.

At 1615, the base station may estimate the UE phase noise component based on the received first set of reference signals. The operations of 1615 may be performed according to the methods described herein. In some examples, aspects of the operations of 1615 may be performed by a phase noise manager as described with reference to FIGS. 10 through 13.

At 1620, the base station may generate a compensated downlink transmission that is compensated based on the estimated UE phase noise component, where generating the compensated downlink transmission includes applying a multiplication factor associated with the estimated UE phase noise component to the compensated downlink transmission. The operations of 1620 may be performed according to the methods described herein. In some examples, aspects of the operations of 1620 may be performed by a compensation manager as described with reference to FIGS. 10 through 13.

At 1625, the base station may transmit the compensated downlink transmission to the UE. The operations of 1625 may be performed according to the methods described herein. In some examples, aspects of the operations of 1625 may be performed by a downlink manager as described with reference to FIGS. 10 through 13.

Figure 17:
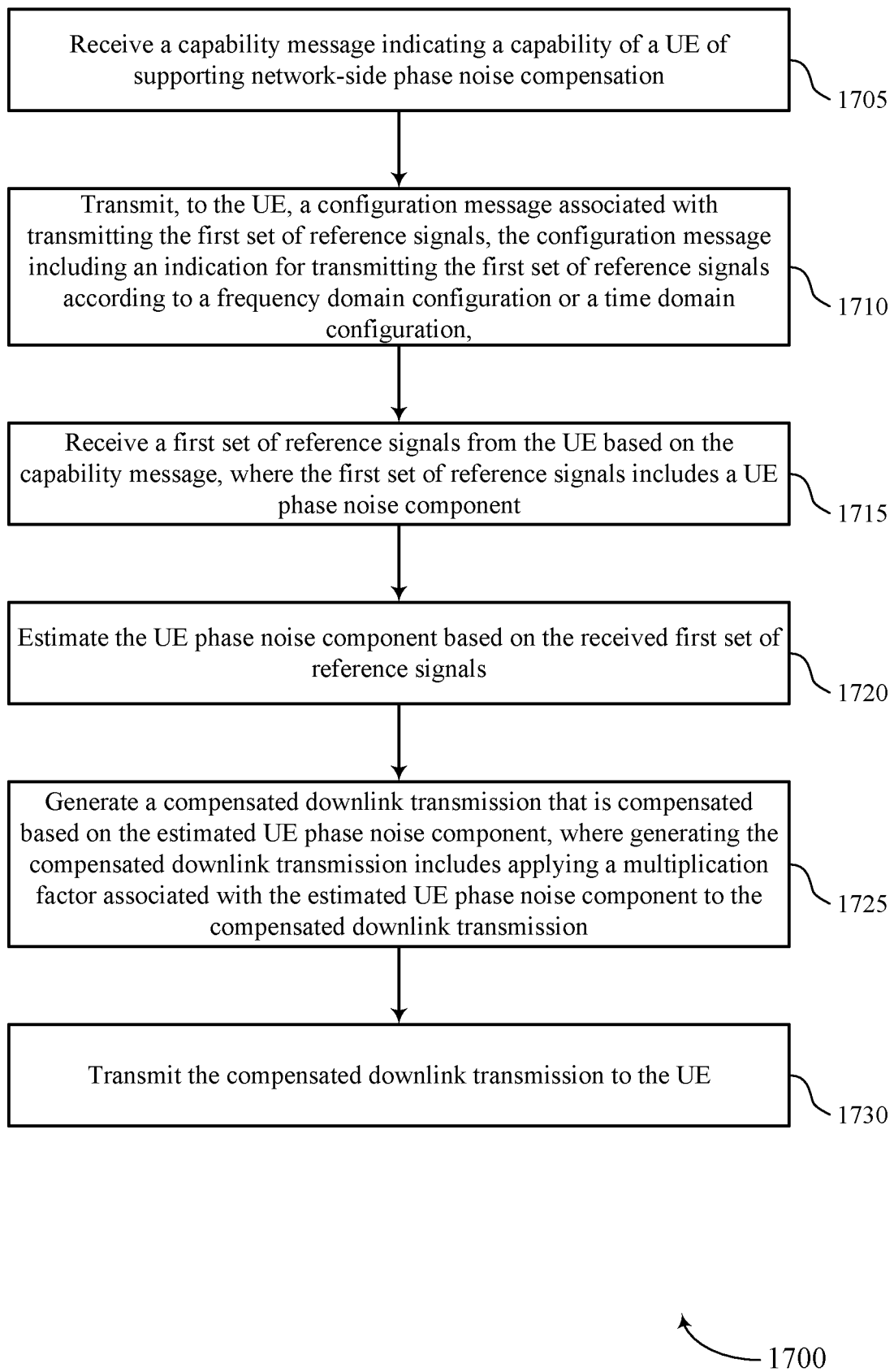

FIG. 17 shows a flowchart illustrating a method 1700 that supports phase noise compensation based on base station capability in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive a capability message indicating a capability of a UE of supporting network-side phase noise compensation. The operations of 1705 may be performed according to the methods described herein. In some examples, aspects of the operations of 1705 may be performed by a messaging manager as described with reference to FIGS. 10 through 13.

At 1710, the base station may transmit, to the UE, a configuration message associated with transmitting the first set of reference signals, the configuration message including an indication for transmitting the first set of reference signals according to a frequency domain configuration or a time domain configuration. The operations of 1710 may be performed according to the methods described herein. In some examples, aspects of the operations of 1710 may be performed by a messaging manager as described with reference to FIGS. 10 through 13.

At 1715, the base station may receive a first set of reference signals from the UE based on the capability message, where the first set of reference signals includes a UE phase noise component. In some aspects, the base station may receive the first set of reference signals based on transmitting the configuration message. The operations of 1715 may be performed according to the methods described herein. In some examples, aspects of the operations of 1715 may be performed by a reference signal manager as described with reference to FIGS. 10 through 13.

At 1720, the base station may estimate the UE phase noise component based on the received first set of reference signals. The operations of 1720 may be performed according to the methods described herein. In some examples, aspects of the operations of 1720 may be performed by a phase noise manager as described with reference to FIGS. 10 through 13.

At 1725, the base station may generate a compensated downlink transmission that is compensated based on the estimated UE phase noise component, where generating the compensated downlink transmission includes applying a multiplication factor associated with the estimated UE phase noise component to the compensated downlink transmission. The operations of 1725 may be performed according to the methods described herein. In some examples, aspects of the operations of 1725 may be performed by a compensation manager as described with reference to FIGS. 10 through 13.

At 1730, the base station may transmit the compensated downlink transmission to the UE. The operations of 1730 may be performed according to the methods described herein. In some examples, aspects of the operations of 1730 may be performed by a downlink manager as described with reference to FIGS. 10 through 13.

The following provides an overview of aspects of the present disclosure:

Aspect 1: A method for wireless communication at a UE, comprising: transmitting, to a base station, a capability message indicating a capability of supporting network-side phase noise compensation; transmitting, to the base station, a first set of reference signals based at least in part on the capability message, wherein the first set of reference signals comprises a UE phase noise component; and receiving, from the base station, a compensated downlink transmission that is compensated based at least in part on the UE phase noise component of the first set of reference signals.

Aspect 2: The method of aspect 1, further comprising: receiving, from the base station, a configuration message associated with transmitting the first set of reference signals, the configuration message comprising an indication for transmitting the first set of reference signals according to a frequency domain configuration or a time domain configuration, wherein transmitting the first set of reference signals is based at least in part on receiving the configuration message.

Aspect 3: The method of aspect 2, wherein the configuration message comprises an indication to transmit the first set of reference signals for network-side phase noise compensation for every scheduled downlink transmission for the UE regardless of whether uplink resources for the UE are scheduled.

Aspect 4: The method of any of aspects 1 through 3, further comprising: identifying a combined duration comprising a first duration associated with network-side estimation of the UE phase noise component and a second duration comprising a round trip communication delay between the UE and the base station; estimating a UE phase noise temporal variation value indicating a level of change in the UE phase noise component for a time period; and transmitting a disabling request message to the base station based at least in part on the combined duration exceeding the estimated UE phase noise temporal variation value, the disabling request message comprising a request to disable network-side phase noise compensation.

Aspect 5: The method of any of aspects 1 through 4, further comprising: transmitting an enabling request message comprising a request for network-side phase noise compensation and a request for downlink reference signal disabling for a duration corresponding to the network-side phase noise compensation.

Aspect 6: The method of aspect 5, wherein the downlink reference signal comprises a PTRS.

Aspect 7: The method of any of aspects 1 through 6, further comprising: receiving, from the base station, a configuration message comprising an indication of disabling the network-side phase noise compensation.

Aspect 8: The method of aspect 7, wherein the configuration message comprises an indication of downlink reference signal enabling for a duration corresponding to the disabling of the network-side phase noise compensation, the downlink reference signal comprises a PTRS.

Aspect 9: The method of any of aspects 7 through 8, wherein receiving the configuration message comprises receiving a MAC-CE or a DCI message.

Aspect 10: The method of any of aspects 1 through 9, wherein the compensated downlink transmission is compensated based at least in part on an impairment between an I path and a Q path of the base station exceeding a threshold.

Aspect 11: The method of aspect 10, wherein the impairment is estimated based at least in part on a phase difference between the I path and the Q path satisfying a phase threshold, an amplitude difference between the I path and the Q path satisfying an amplitude threshold, a temporal difference between the I path and the Q path satisfying a temporal difference threshold, or a combination thereof.

Aspect 12: The method of any of aspects 1 through 11, wherein transmitting the capability message comprises transmitting a radio resource control message.

Aspect 13: The method of any of aspects 1 through 12, further comprising: receiving a second capability message from the base station indicating a capability of the base station of supporting network-side phase noise compensation, wherein transmitting the first set of reference signals is based at least in part on receiving the second capability message.

Aspect 14: A method for wireless communication at a base station, comprising: receiving a capability message indicating a capability of a UE of supporting network-side phase noise compensation; receiving a first set of reference signals from the UE based at least in part on the capability message, wherein the first set of reference signals comprises a UE phase noise component; estimating the UE phase noise component based at least in part on the received first set of reference signals; generating a compensated downlink transmission that is compensated based at least in part on the estimated UE phase noise component, wherein generating the compensated downlink transmission comprises applying a multiplication factor associated with the estimated UE phase noise component to the compensated downlink transmission; and transmitting the compensated downlink transmission to the UE.

Aspect 15: The method of aspect 14, further comprising: transmitting, to the UE, a configuration message associated with transmitting the first set of reference signals, the configuration message comprising an indication for transmitting the first set of reference signals according to a frequency domain configuration or a time domain configuration, wherein receiving the first set of reference signals is based at least in part on transmitting the configuration message.

Aspect 16: The method of aspect 15, wherein the configuration message comprises an indication for the UE to transmit the first set of reference signals for network-side phase noise compensation for every scheduled downlink transmission for the UE regardless of whether uplink resources for the UE are scheduled.

Aspect 17: The method of any of aspects 14 through 16, further comprising: receiving a disabling request message comprising a request to disable network-side phase noise compensation; and disabling the network-side phase noise compensation based at least in part on the received disabling request message.

Aspect 18: The method of any of aspects 14 through 17, further comprising: receiving an enabling request message comprising a request for network-side phase noise compensation and a request for downlink reference signal disabling for a duration corresponding to the network-side phase noise compensation.

Aspect 19: The method of aspect 18, wherein the downlink reference signal comprises a PTRS.

Aspect 20: The method of any of aspects 14 through 19, further comprising: identifying a combined duration comprising a first duration associated with network-side estimation of the UE phase noise component and a second duration comprising a round trip communication delay between the UE and the base station; estimating a UE phase noise temporal variation value indicating a level of change in the UE phase noise component for a time period; disabling the network-side phase noise compensation based at least in part on the combined duration exceeding the estimated UE phase noise temporal variation value; and transmitting a configuration message to the UE comprising an indication of the disabling of the network-side phase noise compensation.

Aspect 21: The method of aspect 20, wherein the configuration message comprises an indication of downlink reference signal enabling for a duration corresponding to the disabling of the network-side phase noise compensation, the method further comprising; and transmitting a set of downlink reference signals based at least in part on the indication of downlink reference signal enabling, wherein the set of downlink reference signals comprise PTRSs.

Aspect 22: The method of any of aspects 20 through 21, wherein transmitting the configuration message comprises transmitting a MAC-CE or a DCI message.

Aspect 23: The method of any of aspects 14 through 22, further comprising: estimating an impairment between an I path and a Q path of the base station, wherein generating the compensated downlink transmission comprises compensating a downlink transmission based at least in part on the impairment exceeding a threshold.

Aspect 24: The method of aspect 23, wherein estimating the impairment is based at least in part on a phase difference between the I path and the Q path satisfying a phase threshold, an amplitude difference between the I path and the Q path satisfying an amplitude threshold, a temporal difference between the I path and the Q path satisfying a temporal difference threshold, or a combination thereof.

Aspect 25: The method of any of aspects 14 through 24, wherein receiving the capability message comprises receiving a radio resource control message.

Aspect 26: The method of any of aspects 14 through 25, further comprising: transmitting a second capability message to the UE indicating a capability of the base station of supporting network-side phase noise compensation, wherein receiving the first set of reference signals is based at least in part on transmitting the second capability message.

Aspect 27: The method of any of aspects 14 through 26, further comprising: estimating a distance between the base station and the UE; selecting a mode from a set of modes associated with estimating the UE phase noise component, based at least in part on the estimated distance, the set of modes comprising; a first mode for estimating the UE phase noise component per symbol of a set of symbols; and a second mode for estimating the UE phase noise component per slot of a set of slots.

Aspect 28: An apparatus for wireless communication at a UE, comprising a processor; memory coupled with the processor; and instructions stored in the memory and executable by the processor to cause the apparatus to perform a method of any of aspects 1 through 13.

Aspect 29: An apparatus for wireless communication at a UE, comprising at least one means for performing a method of any of aspects 1 through 13.

Aspect 30: A non-transitory computer-readable medium storing code for wireless communication at a UE, the code comprising instructions executable by a processor to perform a method of any of aspects 1 through 13.

Aspect 31: An apparatus for wireless communication at a base station, comprising a processor; memory coupled with the processor; and instructions stored in the memory and executable by the processor to cause the apparatus to perform a method of any of aspects 14 through 27.

Aspect 32: An apparatus for wireless communication at a base station, comprising at least one means for performing a method of any of aspects 14 through 27.

Aspect 33: A non-transitory computer-readable medium storing code for wireless communication at a base station, the code comprising instructions executable by a processor to perform a method of any of aspects 14 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting, to a network device, a control message comprising a capability message indicating a capability of supporting network-side phase noise compensation;
    transmitting, to the network device, a first set of reference signals based at least in part on and subsequent to transmitting the capability message, wherein the first set of reference signals comprises a UE phase noise component; and
    receiving, from the network device, a compensated downlink transmission that is compensated based at least in part on the UE phase noise component of the first set of reference signals.

2. The method of claim 1, further comprising:
    receiving, from the network device, a configuration message associated with transmitting the first set of reference signals, the configuration message comprising an indication for transmitting the first set of reference signals according to a frequency domain configuration or a time domain configuration,
    wherein transmitting the first set of reference signals is based at least in part on receiving the configuration message.

3. The method of claim 2, wherein the configuration message comprises an indication to transmit the first set of reference signals for network-side phase noise compensation for every scheduled downlink transmission for the UE regardless of whether uplink resources for the UE are scheduled.

4. The method of claim 1, further comprising:
    identifying a combined duration comprising a first duration associated with network-side estimation of the UE phase noise component and a second duration comprising a round trip communication delay between the UE and the network device;
    estimating a UE phase noise temporal variation value indicating a level of change in the UE phase noise component for a time period; and
    transmitting a disabling request message to the network device based at least in part on the combined duration exceeding the estimated UE phase noise temporal variation value, the disabling request message comprising a request to disable network-side phase noise compensation.

5. The method of claim 1, further comprising:
    transmitting an enabling request message comprising a request for network-side phase noise compensation and a request for downlink reference signal disabling for a duration corresponding to the network-side phase noise compensation.

6. The method of claim 5, wherein the downlink reference signal comprises a phase tracking reference signal (PTRS).

7. The method of claim 1, further comprising:
    receiving, from the network device, a configuration message comprising an indication of disabling the network-side phase noise compensation.

8. The method of claim 7, wherein the configuration message comprises an indication of downlink reference signal enabling for a duration corresponding to the disabling of the network-side phase noise compensation, wherein the downlink reference signal comprises a phase tracking reference signal (PTRS).

9. The method of claim 7, wherein receiving the configuration message comprises receiving a media access control (MAC) control element (MAC-CE) or a downlink control information (DCI) message.

10. The method of claim 1, wherein the compensated downlink transmission is compensated based at least in part on an impairment between an in-phase (I) path and a quadrature-phase (Q) path of the network device exceeding a threshold.

11. The method of claim 10, wherein the impairment is estimated based at least in part on a phase difference between the I path and the Q path satisfying a phase threshold, an amplitude difference between the I path and the Q path satisfying an amplitude threshold, a temporal difference between the I path and the Q path satisfying a temporal difference threshold, or a combination thereof.

12. The method of claim 1, wherein transmitting the capability message comprises transmitting a radio resource control message.

13. The method of claim 1, further comprising:
    receiving a second capability message from the network device indicating a capability of the network device of supporting network-side phase noise compensation, wherein transmitting the first set of reference signals is based at least in part on receiving the second capability message.

14. A method for wireless communication at a network device, comprising:
receiving a control message comprising a capability message indicating a capability of a user equipment (UE) of supporting network-side phase noise compensation;
receiving a first set of reference signals from the UE based at least in part on and subsequent to receiving the capability message, wherein the first set of reference signals comprises a UE phase noise component;
estimating the UE phase noise component based at least in part on the received first set of reference signals;
generating a compensated downlink transmission that is compensated based at least in part on the estimated UE phase noise component, wherein generating the compensated downlink transmission comprises applying a multiplication factor associated with the estimated UE phase noise component to the compensated downlink transmission; and
transmitting the compensated downlink transmission to the UE.

15. The method of claim 14, further comprising:
transmitting, to the UE, a configuration message associated with transmitting the first set of reference signals, the configuration message comprising an indication for transmitting the first set of reference signals according to a frequency domain configuration or a time domain configuration,
wherein receiving the first set of reference signals is based at least in part on transmitting the configuration message.

16. The method of claim 15, wherein the configuration message comprises an indication for the UE to transmit the first set of reference signals for network-side phase noise compensation for every scheduled downlink transmission for the UE regardless of whether uplink resources for the UE are scheduled.

17. The method of claim 14, further comprising:
receiving a disabling request message comprising a request to disable network- side phase noise compensation; and
disabling the network-side phase noise compensation based at least in part on the received disabling request message.

18. The method of claim 14, further comprising:
receiving an enabling request message comprising a request for network-side phase noise compensation and a request for downlink reference signal disabling for a duration corresponding to the network-side phase noise compensation.

19. The method of claim 18, wherein the downlink reference signal comprises a phase tracking reference signal (PTRS).

20. The method of claim 14, further comprising:
identifying a combined duration comprising a first duration associated with network-side estimation of the UE phase noise component and a second duration comprising a round trip communication delay between the UE and the network device;
estimating a UE phase noise temporal variation value indicating a level of change in the UE phase noise component for a time period;
disabling the network-side phase noise compensation based at least in part on the combined duration exceeding the estimated UE phase noise temporal variation value; and
transmitting a configuration message to the UE comprising an indication of the disabling of the network-side phase noise compensation.

21. The method of claim 20, wherein the configuration message comprises an indication of downlink reference signal enabling for a duration corresponding to the disabling of the network-side phase noise compensation, the method further comprising:
transmitting a set of downlink reference signals based at least in part on the indication of downlink reference signal enabling, wherein the set of downlink reference signals comprise phase tracking reference signals (PTRSs).

22. The method of claim 20, wherein transmitting the configuration message comprises transmitting a media access control (MAC) control element (MAC-CE) or a downlink control information (DCI) message.

23. The method of claim 14, further comprising:
estimating an impairment between an in-phase (I) path and a quadrature-phase (Q) path of the network device, wherein generating the compensated downlink transmission comprises compensating a downlink transmission based at least in part on the impairment exceeding a threshold.

24. The method of claim 23, wherein estimating the impairment is based at least in part on a phase difference between the I path and the Q path satisfying a phase threshold, an amplitude difference between the I path and the Q path satisfying an amplitude threshold, a temporal difference between the I path and the Q path satisfying a temporal difference threshold, or a combination thereof.

25. The method of claim 14, wherein receiving the capability message comprises receiving a radio resource control message.

26. The method of claim 14, further comprising:
transmitting a second capability message to the UE indicating a capability of the network device of supporting network-side phase noise compensation, wherein receiving the first set of reference signals is based at least in part on transmitting the second capability message.

27. The method of claim 14, further comprising:
estimating a distance between the network device and the UE; and
selecting a mode from a set of modes associated with estimating the UE phase noise component, based at least in part on the estimated distance, the set of modes comprising:
a first mode for estimating the UE phase noise component per symbol of a set of symbols; and
a second mode for estimating the UE phase noise component per slot of a set of slots.

28. An apparatus for wireless communication at a user equipment (UE), comprising:
- a processor,
- memory coupled with the processor; and
- instructions stored in the memory and executable by the processor to cause the apparatus to:
  - transmit, to a network device, a control message comprising a capability message indicating a capability of supporting network-side phase noise compensation;
  - transmit, to the network device, a first set of reference signals based at least in part on and subsequent to transmitting the capability message, wherein the first set of reference signals comprises a UE phase noise component; and
  - receive, from the network device, a compensated downlink transmission that is compensated based at least in part on the UE phase noise component of the first set of reference signals.

29. The apparatus of claim 28, wherein the instructions are further executable by the processor to cause the apparatus to:
- receive, from the network device, a configuration message associated with transmitting the first set of reference signals, the configuration message comprising an indication for transmitting the first set of reference signals according to a frequency domain configuration or a time domain configuration,
- wherein transmitting the first set of reference signals is based at least in part on receiving the configuration message.

30. An apparatus for wireless communication at a network device, comprising:
- a processor,
- memory coupled with the processor; and
- instructions stored in the memory and executable by the processor to cause the apparatus to:
  - receive a control message comprising a capability message indicating a capability of a user equipment (UE) of supporting network-side phase noise compensation;
  - receive a first set of reference signals from the UE based at least in part on and subsequent to receiving the capability message, wherein the first set of reference signals comprises a UE phase noise component;
  - estimate the UE phase noise component based at least in part on the received first set of reference signals;
  - generate a compensated downlink transmission that is compensated based at least in part on the estimated UE phase noise component, wherein generating the compensated downlink transmission comprises applying a multiplication factor associated with the estimated UE phase noise component to the compensated downlink transmission; and
  - transmit the compensated downlink transmission to the UE.

* * * * *